United States Patent
Miyoshi et al.

(10) Patent No.: US 6,760,590 B2
(45) Date of Patent: Jul. 6, 2004

(54) COMMUNICATION TERMINAL APPARATUS, BASE STATION APPARATUS, AND RADIO COMMUNICATION METHOD

(75) Inventors: Kenichi Miyoshi, Yokohama (JP); Osamu Kato, Yokosuka (JP); Junichi Aizawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 215 days.

(21) Appl. No.: 10/089,605

(22) PCT Filed: Aug. 2, 2001

(86) PCT No.: PCT/JP01/06654

§ 371 (c)(1),
(2), (4) Date: Apr. 1, 2002

(87) PCT Pub. No.: WO02/13570

PCT Pub. Date: Feb. 14, 2002

(65) Prior Publication Data

US 2002/0151311 A1 Oct. 17, 2002

(30) Foreign Application Priority Data

Aug. 2, 2000 (JP) ........................................ 2000-234420
Sep. 20, 2000 (JP) ........................................ 2000-285405

(51) Int. Cl.[7] .............................................. H04Q 7/20
(52) U.S. Cl. ............................... 455/452.1; 455/452.2; 455/450; 455/517; 370/329; 370/330; 370/335; 375/244; 375/246
(58) Field of Search ............................. 455/452.1, 450, 455/452.2, 517, 422.1, 423, 464; 370/329, 330, 335, 342, 341; 375/244, 246

(56) References Cited

U.S. PATENT DOCUMENTS 5,752,166 A    5/1998  Dorenbosch et al.
6,208,715 B1 *  3/2001  Haavisto ................... 379/88.07
6,341,125 B1 *  1/2002  Hong et al. ................. 370/335
6,452,914 B2 *  9/2002  Niemela ..................... 370/337
6,456,598 B1    9/2002  Le Strat et al.
6,526,271 B1 *  2/2003  Uesugi et al. .............. 455/296
2002/0001292 A1  1/2002  Miyamoto
2002/0061750 A1  5/2002  Mohebbi
2002/0094810 A1  7/2002  Hassan
2002/0168944 A1  11/2002  Terry et al.
2003/0002446 A1  1/2003  Komaili et al.
2003/0095532 A1 *  5/2003  Kim et al. .................. 370/342
2003/0157900 A1 *  8/2003  Gaal et al. .................... 455/69

FOREIGN PATENT DOCUMENTS

JP    62163432      7/1987
JP    08223113      8/1996
JP    11331057     11/1999
JP    2000049663   2/2000

OTHER PUBLICATIONS

"HDR Reverse Link Proposal", E. Esteves, et al., *Qualcomm Inc.*, pp. 1–10.
International Search Report dated Nov. 13, 2001.
Japanese Office Action dated Jan. 7, 2003 with English translation.

* cited by examiner

*Primary Examiner*—William Trost
*Assistant Examiner*—Danh Le
(74) *Attorney, Agent, or Firm*—Stevens, Davis, Miller & Mosher, LLP.

(57) ABSTRACT

A communication mode determination section 201 determines the communication mode based on the CIR measured by a CIR measurement section 219; a DRC signal creation section 202 creates a DRC signal with a number corresponding to the communication mode; and a DRC power controller 205 refers to a transmission power table 206 showing the correspondence between DRC numbers and transmission power, and, based on the transmission power of the pilot signal output from a pilot power controller 209, increases transmission power in proportion as the DRC signal indicates that downlink channel quality is good.

8 Claims, 17 Drawing Sheets

| DRC NUMBER | TRANSMISSION POWER (RATIO TO PILOT SIGNAL TRANSMISSION POWER) |
|---|---|
| 1 | −2dB |
| 2 | −1dB |
| 3 | 0dB |
| 4 | +1dB |
| 5 | +2dB |

FIG.4

| DRC NUMBER | CODE WORD | CODE WORD MINIMUM DISTANCE |
|---|---|---|
| 1 | 000000000 | 1 |
| 2 | 000000001 | 1 |
| 3 | 000000110 | 2 |
| 4 | 000111000 | 3 |
| 5 | 111111111 | 6 |

FIG.7

COMMUNICATION TERMINAL APPARATUS, BASE STATION APPARATUS, AND RADIO COMMUNICATION METHOD

This application is a 371 of PCT/JP01/0665 Aug. 8, 2001.

TECHNICAL FIELD

The present invention relates to a communication terminal apparatus, base station apparatus, and radio communication method to be used in a cellular communication system.

BACKGROUND ART

In a cellular communication system, one base station performs radio communication with a plurality of communication terminals simultaneously, and therefore, as demand has increased in recent years, so has the need for higher transmission efficiency.

One technology that has been proposed for increasing the transmission efficiency of a downlink from a base station to a communication terminal is HDR (High Data Rate). HDR is a communication method whereby a base station performs scheduling for allocating communication resources to communication terminals by time division, and also sets a transmission rate for each communication terminal according to the downlink channel quality.

The operations by which a base station and communication terminals perform radio communication with HDR are described below. First, the base station transmits a pilot signal to each communication terminal. Each communication terminal estimates the downlink channel quality using a CIR (desired carrier to interference ratio) based on the pilot signal, etc., and finds a transmission rate at which communication is possible. Then, based on the transmission rate at which communication is possible, each communication terminal selects a communication mode, which is a combination of packet length, coding method, and modulation method, and transmits a data rate control (hereinafter referred to as "DRC") signal indicating the communication mode to the base station.

The type of modulation method that can be used in each system is predetermined as BPSK, QPSK, 16 QAM, 64 QAM, and so forth. Also, the type of coding that can be used in each system is predetermined as ½ turbo code, ⅓ turbo code, ¾ turbo code, and so forth. Further, a plurality of transmission rates that can be used in each system are predetermined according to a combination of packet length, modulation method, and coding method. Each communication terminal selects a combination whereby communication can be performed most efficiently with the current downlink channel quality, and transmits a DRC signal indicating the selected communication mode to the base station. Generally, DRC signals are represented by numbers from 1 to N, with a higher number indicating a proportionally better downlink channel quality.

Based on the DRC signal transmitted from each communication terminal, the base station sets a transmission rate for each communication terminal, and sends a signal to each communication terminal via a control channel indicating communication resource allocation to each communication terminal. Generally, taking improvement of system transmission efficiency into consideration, communication resources are allocated with priority to the communication terminal that has the best downlink channel quality-that is to say, the communication terminal that transmits the highest-numbered DRC signal.

The base station then transmits data only to the relevant communication terminal in its allocated time. For example, if time t1 has been allocated to communication terminal A, in time t1 the base station transmits data only to communication terminal A, and does not transmit data to a communication terminal other than communication terminal A.

In this way, data transmission efficiency has conventionally been increased for the overall system by setting a transmission rate for each communication terminal according to channel quality by means of HDR, and performing communication resource allocation with priority to a communication terminal with a high transmission rate at which communication is possible.

However, if the communication mode determined by a communication terminal is received erroneously by the base station due to deterioration of the channel conditions on the uplink from the communication terminal to the base station, or the like, the base station will transmit data using that erroneous mode. As the determined communication mode and the communication mode of data transmitted to the communication terminal are different, the communication terminal cannot demodulate or decode the data.

Also, when a base station such as that described above has allocated time t1 to communication terminal A, in time t1 the base station transmits data only to communication terminal A, and does not transmit data to a communication terminal other than communication terminal A.

Due to the above, a problem arises in that, if the communication mode determined by a communication terminal is received erroneously by the base station, there will be an interval during which time-divided communication resources are not used, and downlink throughput falls.

DISCLOSURE OF INVENTION

It is an object of the present invention to provide a communication terminal apparatus, base station apparatus, and radio communication method that make it possible to prevent a fall in downlink throughput in a communication system in which communication resources are allocated to communication terminals based on downlink channel quality.

In order to achieve the above-described object, in the present invention, with respect to information, among information indicative of downlink channel quality, which has a possibility of decreasing the downlink throughput when the information is received erroneously in a base station, a communication terminal provides such information with less susceptibility to errors in the propagation path to transmit. It is thereby possible to prevent the downlink throughput from decreasing.

BRIEF DESCRIPTION OF DRAWINGS

FIG. 4 is a drawing showing the contents of the transmission power table provided in a communication terminal according to Embodiment 1 of the present invention;

FIG. 7 is a drawing showing the contents of the code word table provided in a communication terminal according to Embodiment 2 of the present invention;

BEST MODE FOR CARRYING OUT THE INVENTION

With reference now to the accompanying drawings, embodiments of the present invention will be explained in detail below.

Embodiment 1

Figure 1:
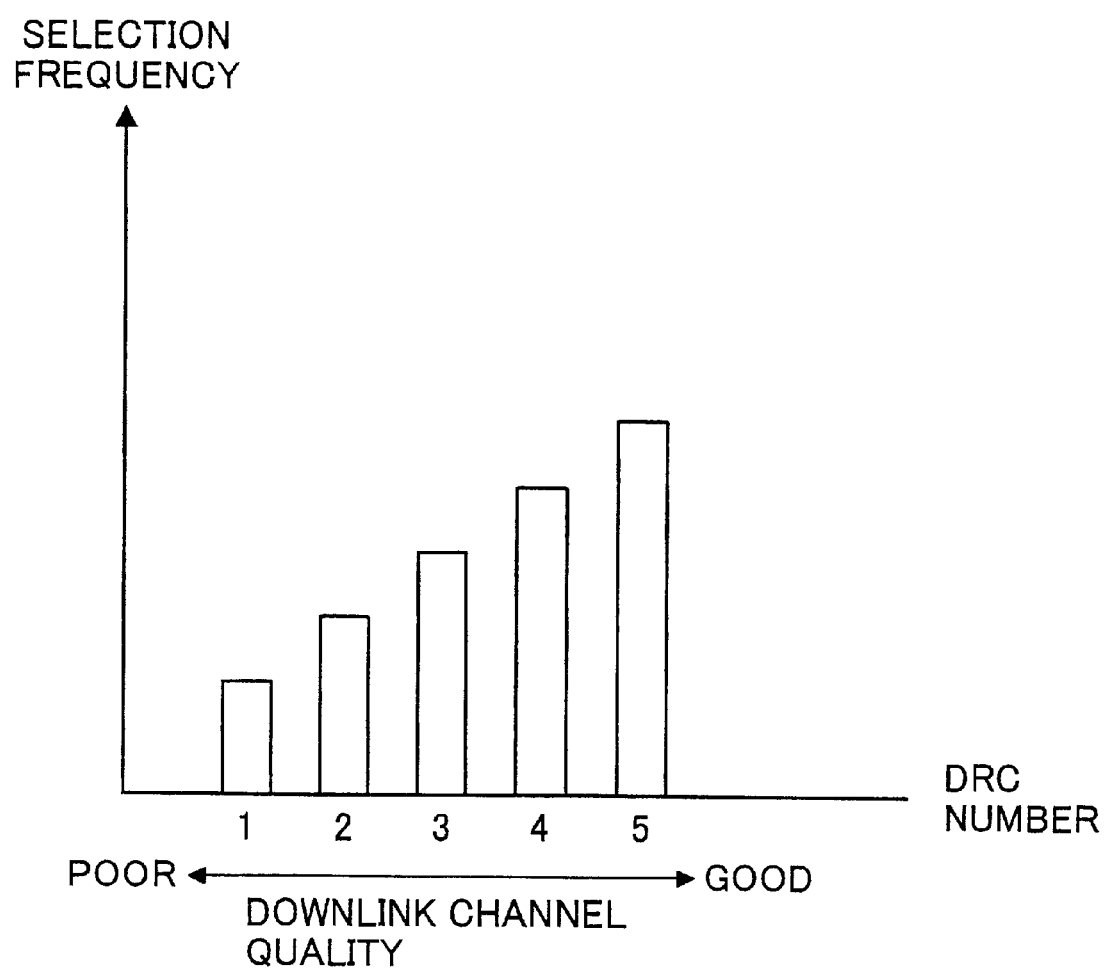
FIG. 1 a graph illustrating DRC signal selection frequency in a base station.

As stated above, a base station allocates communication resources with priority to the communication terminal with the best downlink channel quality. In other words, a base station selects the highest-numbered DRC signal, and allocates communication resources with priority to the communication terminal that transmitted that selected DRC signal. Thus, DRC signal selection frequency is as shown in FIG. 1. FIG. 1 is a graph illustrating DRC signal selection frequency in a base station. In this figure, numbers 1 to 5 are used as DRC numbers, with a higher number representing a proportionally better channel quality.

As shown in FIG. 1, the higher the number of a DRC signal, the greater is the frequency of its selection by the base station. That is to say, the better the downlink channel quality of a communication terminal, the higher is the frequency with which communication resources are allocated to that communication terminal. This kind of relationship arises from the fact that there are many communication terminals, and there is an increased probability of there being a communication terminal with good downlink channel quality.

Thus, the selection frequency of each DRC signal differs according to channel quality. That is to say, since a DRC signal indicating that downlink channel quality is good tends to be selected with greater frequency, there is a high probability that downlink throughput will fall if a DRC signal indicating that downlink channel quality is good is received erroneously. Also, since a DRC signal indicating that downlink channel quality is poor tends to be selected with lower frequency, there is little effect of producing a fall in downlink throughput if a DRC signal indicating that downlink channel quality is poor is received erroneously.

Thus, a communication terminal according to Embodiment 1 of the present invention transmits at proportionally higher transmission power a DRC signal indicating that downlink channel quality is good. Also, a base station according to Embodiment 1 of the present invention excludes DRC signals with reception power lower than a predetermined threshold value in performing communication resource allocation.

Figure 2:
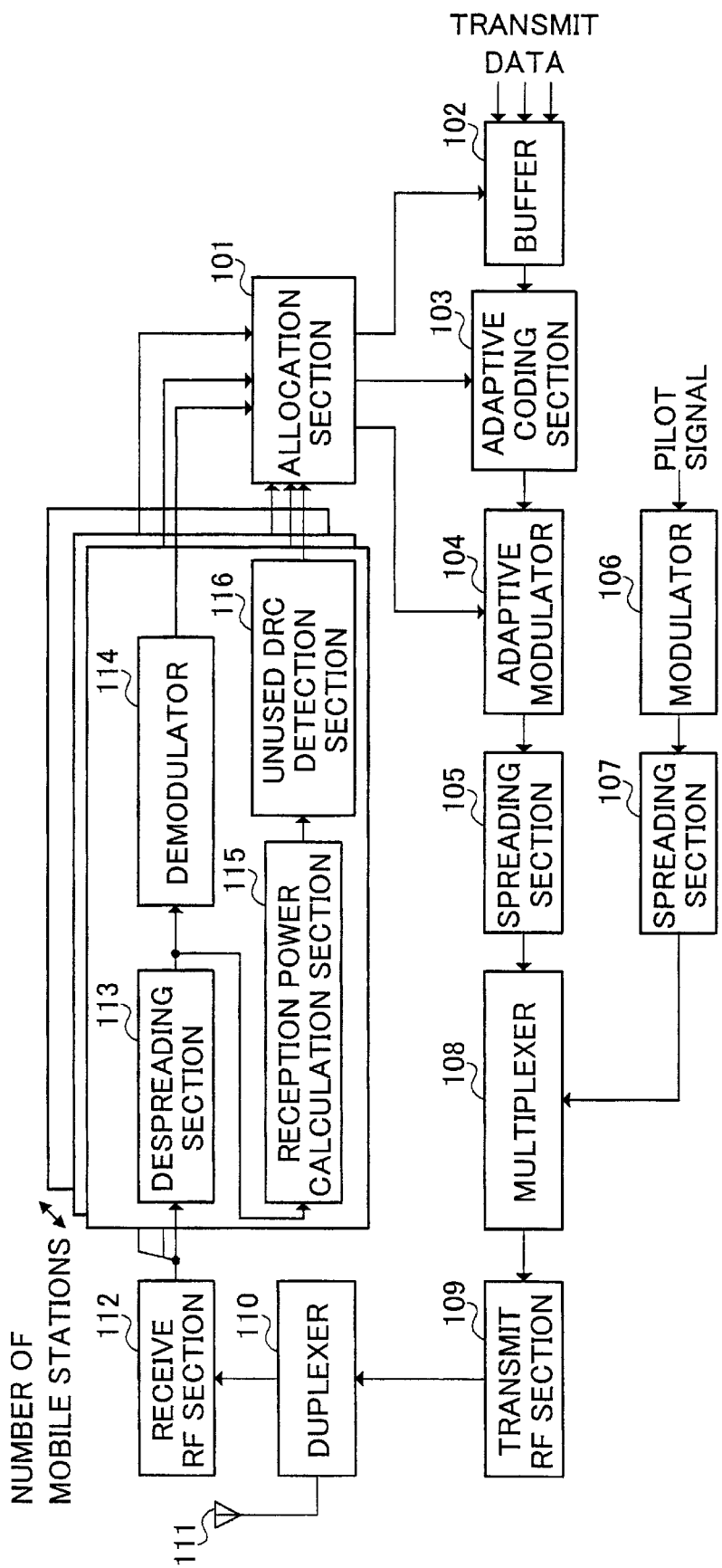
FIG. 2 is a block diagram showing a configuration of a base station according to Embodiment 1 of the present invention.

FIG. 2 is a block diagram showing a configuration of a base station according to Embodiment 1 of the present invention.

In FIG. 2, an allocation section 101 determines communication resource allocation to each communication terminal based on DRC signals excluding DRC signals detected by unused DRC detection sections 116 described later herein from among DRC signals extracted by demodulators 114 described later herein. Then, based on the determined communication resource allocation, the allocation section 101 notifies a buffer 102 for output of downlink transmit data, indicates the downlink transmit data coding method to an adaptive coding section 103, and indicates the downlink transmit data modulation method to an adaptive modulator 104.

The buffer 102 holds downlink transmit data, and outputs downlink transmit data for a predetermined communication terminal to the adaptive coding section 103 in accordance with the directions of the allocation section 101. The adaptive coding section 103 codes the output signal from the buffer 102 in accordance with the directions of the allocation section 101, and outputs the resulting signal to the adaptive modulator 104. The adaptive modulator 104 modulates the output signal from the adaptive coding section 103 in accordance with the directions of the allocation section 101, and outputs the resulting signal to a spreading section 105. Spreading section 105 spreads the output signal from the adaptive modulator 104, and outputs the resulting signal to a multiplexer 108.

A modulator 106 modulates a pilot signal and outputs it to a spreading section 107. Spreading section 107 spreads the output signal from the modulator 106, and outputs the resulting signal to the multiplexer 108.

The multiplexer 108 performs time multiplexing of the spread pilot signal with the spread downlink transmit data at predetermined intervals, and outputs the resulting signal to a transmit RF section 109. The transmit RF section 109 converts the frequency of the output signal from the multiplexer 108 to radio frequency, and outputs the resulting signal to a duplexer 110.

The duplexer 110 transmits the output signal from the transmit RF section 109 as a radio signal from an antenna 111 to a communication terminal. Moreover, the duplexer 110 outputs the signals transmitted from each communication terminal and received by antenna 111 to receive RF section 112.

A receive RF section 112 converts the frequency of a radio frequency signal output from the duplexer 110 to baseband, and outputs the resulting signal to a despreading section 113. The despreading section 113 despreads the baseband signal using the spreading code used to spread the DRC signal, and outputs the resulting signal to the demodulator 114 and a reception power calculation section 115.

The demodulator 114 demodulates the output signal from the despreading section 113 and extracts the DRC signal, and outputs this signal to the allocation section 101.

The reception power calculation section 115 measures the reception power of the despread DRC signal, which is output to the unused DRC detection section 116. In the unused DRC detection section 116 is set a predetermined threshold value, as described later herein, and a DRC signal of reception power lower than this threshold value is detected, and the result of the detection is output to the allocation section 101.

A despreading section 113, demodulator 114, reception power calculation section 115, and unused DRC detection section 116 are provided for each communication terminal. From each demodulator 114 a DRC signal for the corresponding communication terminal is output, and from each unused DRC detection section 116 a detection result for the corresponding communication terminal is output.

Figure 3:
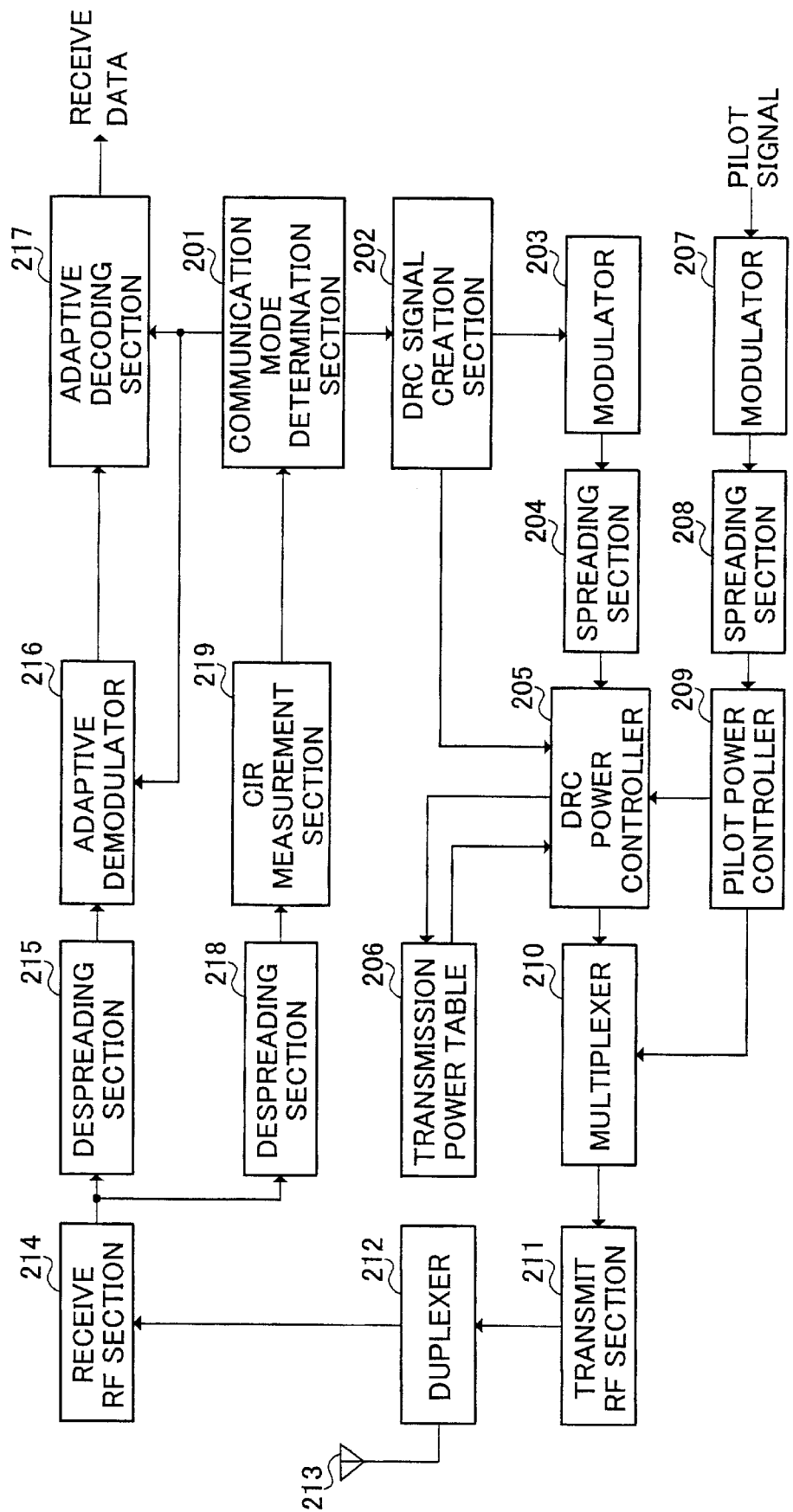
FIG. 3 is a block diagram showing the configuration of a communication terminal according to Embodiment 1 of the present invention.

FIG. 3 is a block diagram showing the configuration of a communication terminal according to Embodiment 1 of the present invention. In FIG. 3, a communication mode determination section 201 determines a communication mode indicating a combination of modulation method and coding method based on a CIR measured by a CIR measurement section 219 described later herein, and outputs the result to a DRC signal creation section 202. The communication mode determination section 201 also indicates the downlink receive data demodulation method to an adaptive demodulator 216, and indicates the downlink receive data decoding method to an adaptive decoding section 217, based on the determined communication mode.

The DRC signal creation section 202 creates a DRC signal with a number corresponding to the communication mode output from the communication mode determination section 201, and outputs this DRC signal to a modulator 203 and DRC power controller 205.

Modulator 203 modulates the DRC signal and outputs the resulting signal to a spreading section 204. Spreading section 204 spreads the output signal from modulator 203 and outputs the resulting signal to the DRC power controller 205. The DRC power controller 205 refers to a transmission power table 206 that shows the correspondence between DRC numbers and transmission power, controls the DRC signal transmission power based on the transmission power of a pilot signal output from a pilot power controller 209 described later herein, and outputs the DRC signal that has undergone transmission power control to a multiplexer 210. The actual method of controlling DRC signal transmission power will be described later herein.

A modulator 207 modulates the pilot signal and outputs the resulting signal to a spreading section 208. Spreading section 208 spreads the output signal from modulator 207 and outputs the resulting signal to the pilot power controller 209. The pilot power controller 209 controls the transmission power of the pilot signal, and outputs the pilot signal that has undergone transmission power control to the multiplexer 210. The pilot power controller 209 also outputs the pilot signal transmission power to the DRC power controller 205.

The multiplexer 210 performs time multiplexing of the DRC signal that has undergone transmission power control and the pilot signal that has undergone transmission power control at predetermined intervals, and outputs the resulting signal to a transmit RF section 211. The transmit RF section 211 converts the frequency of the output signal from the multiplexer 210 to radio frequency, and outputs the resulting signal to a duplexer 212.

The duplexer 212 transmits the output signal from the transmit RF section 211 as a radio signal from an antenna 213 to the base station. Also, a signal transmitted as a radio signal by the base station and received as a radio signal by the antenna 213 is output by the duplexer 212 to a receive RF section 214.

The receive RF section 214 converts the frequency of the radio frequency signal output from the duplexer 212 to baseband, and outputs the resulting signal to a despreading section 215 and a despreading section 218.

Despreading section 215 despreads the data component of the baseband signal and outputs the resulting signal to the adaptive demodulator 216. The adaptive demodulator 216 demodulates the output signal from despreading section 215 in accordance with the directions of the communication mode determination section 201, and outputs the resulting signal to the adaptive decoding section 217. The adaptive decoding section 217 decodes the output signal from the adaptive demodulator 216 in accordance with the directions of the communication mode determination section 201, and obtains receive data.

Despreading section 218 despreads the pilot signal component of the baseband signal and outputs the resulting signal to a CIR measurement section 219. The CIR measurement section 219 measures the CIR of the pilot signal output from despreading section 218, and outputs the result to the communication mode determination section 201.

Next, the procedure for transmission/reception of signals between the base station shown in FIG. 2 and the communication terminal shown in FIG. 3 will be described.

First, at the start of communication, a pilot signal is modulated by the modulator 106 in the base station, is spread by spreading section 107, and is output to the multiplexer 108. Only the spread pilot signal is output from the multiplexer 108 to the transmit RF section 109. The spread pilot signal is frequency-converted to radio frequency by the transmit RF section 109, and transmitted to communication terminals as a radio signal from the antenna 111 via the duplexer 110.

A radio signal of only the pilot signal component transmitted as a radio signal from the base station is received by the antenna 213 of the communication terminal, passes through the duplexer 212, and is frequency-converted to baseband by the receive RF section 214. The pilot signal component of the baseband signal is despread by despreading section 218, and output to the CIR measurement section 219.

Next, in the CIR measurement section 219, the CIR of the pilot signal output from despreading section 218 is measured, and based on the CIR, the communication mode is determined by the communication mode determination section 201. Then a DRC signal with a number corresponding to the communication mode is created by the DRC signal creation section 202.

The DRC signal is modulated by modulator 203, spread by spreading section 204, and output to the DRC power controller 205. In the DRC power controller 205, the DRC signal transmission power is controlled based on the transmission power of the pilot signal output from the pilot power controller 209, and the ratios of pilot signal transmission power to DRC signal transmission power set beforehand in the transmission power table 206.

The contents set in the transmission power table 206 will be described below. FIG. 4 is a drawing showing the contents of the transmission power table provided in a communication terminal according to Embodiment 1 of the present invention.

The transmission power table 206 shows the correspondence between DRC numbers and DRC signal transmission power, set so that the higher the DRC number, the higher is the transmission power. Here, numbers 1 to 5 are used as DRC numbers, with a higher number representing a proportionally better downlink channel quality. That is to say, in the settings in the transmission power table 206, the better the downlink channel quality indicated by a DRC signal, the higher is the transmission power.

As explained above, the frequency of selection by the base station tends to be proportional to the downlink channel quality indicated by a DRC signal, and therefore in this embodiment, transmission power is higher, and susceptibility to errors lower, the better the downlink channel quality indicated by a DRC signal. As a result, the probability of a DRC signal that indicates that downlink channel quality is good being received erroneously can be made lower than the probability of a DRC signal that indicates that downlink channel quality is poor being received erroneously. In other words, the probability of a DRC signal with a high frequency of selection by the base station being received erroneously can be made lower than the probability of a DRC signal with a low frequency of selection by the base station being received erroneously.

The DRC signal transmission power values set in the transmission power table 206 are expressed as a ratio to the pilot signal transmission power. Here, as shown in FIG. 4, the settings are arranged so that DRC number 3 in the middle of DRC numbers 1 to 5 is taken as a reference, and DRC signals indicating a lower number than DRC number 3 are transmitted at lower transmission power than the pilot signal transmission power, while DRC signals indicating a higher number than DRC number 3 are transmitted at higher transmission power than the pilot signal transmission power. That is to say, the settings are arranged so that DRC signals indicating a poorer channel quality than a predetermined channel quality (here, the channel quality corresponding to a DRC signal with DRC number 3) are transmitted at lower transmission power than the pilot signal transmission power, while DRC signals indicating a better channel quality than the predetermined channel quality are transmitted at higher transmission power than the pilot signal transmission power.

Thus, with this embodiment, by setting DRC signals for which transmission power is increased and DRC signals for which transmission power is decreased in comparison with conventional DRC signal transmission power (here, that is, pilot signal transmission power), and making the total of DRC signal transmission power increases and decreases ±0 dB, it is possible to make DRC signals indicating that downlink channel quality is good proportionally less susceptible to errors while keeping average DRC signal transmission power constant compared with a conventional system. That is to say, it is possible to proportionally reduce susceptibility to errors of DRC signals indicating that downlink channel quality is good without reducing uplink capacity compared with a conventional system.

Also, since, in this way, DRC signals indicating that downlink channel quality is poor (DRC signals with DRC numbers 1 and 2 in FIG. 4) are transmitted at lower transmission power than in a conventional system, it is possible to reduce power consumption in a communication terminal that is located far from the base station and for which there is a high probability of transmitting a DRC signal indicating that downlink channel quality is poor. That is to say, in the case of a communication terminal that transmits a DRC signal indicating that downlink channel quality is poor, whereas the DRC signal was previously transmitted at transmission power that was high to begin with, according to this embodiment the DRC signal transmission power can be made lower than that high transmission power, enabling communication terminal power consumption to be greatly reduced.

As the frequency of selection by a base station is low to begin with for a DRC signal indicating that downlink channel quality is poor, there is almost no effect of producing a fall in throughput due to transmitting a DRC signal indicating that downlink channel quality is poor at lower transmission power than previously in this way.

Also, with this embodiment, DRC signals indicating that uplink channel quality is good (DRC signals with DRC numbers 4 and 5 in FIG. 4) are transmitted at higher transmission power than in a conventional system. However, there is a high possibility of a DRC signal indicating that uplink channel quality is good being transmitted from a communication terminal located comparatively near the base station. Also, due to pilot signal transmission power control that is performed constantly on an uplink, the transmission power of a pilot signal transmitted from a communication terminal located comparatively near the base station (that is, the conventional DRC signal transmission power) is low to begin with. Therefore, in the case of a communication terminal that transmits a DRC signal indicating that uplink channel quality is good, DRC signal transmission power remains low and power consumption remains low even though the previously originally low DRC signal transmission power increases, and so there is almost no effect on power consumption.

In the DRC power controller 205, the DRC signal transmission power is obtained by having the transmission power of the pilot signal output from the pilot power controller 209 adjusted in accordance with the ratios set in the transmission power table 206. Then, in the DRC power controller 205, the transmission power of the DRC signal output from spreading section 204 is adjusted to this obtained transmission power, and a DRC signal that has been subjected to transmission power control is output to the multiplexer 210. To give a specific example, if the number of the DRC signal output from the DRC signal creation section 202 to the DRC power controller 205 is 5, the transmission power of the DRC signal output from spreading section 204 is adjusted to a transmission power 2 dB lower than the transmission power of the pilot signal output from the pilot power controller 209.

The DRC signal that has undergone transmission power control is multiplexed with the pilot signal by the multiplexer 210, frequency-converted to radio frequency by the transmit RF section 211, and transmitted to the base station as a radio signal from the antenna 213 via the duplexer 212.

The radio signal transmitted from the communication terminal is received by the antenna 111 of the base station, and input to the receive RF section 112 via the duplexer 110. The signal input to the receive RF section 112 is frequency-converted to baseband, despread by the despreading section 113 using the spreading code used to spread the DRC signal, and output to the demodulator 114 and reception power calculation section 115.

In the demodulator 114 the output signal from the despreading section 113 is demodulated, and the DRC signal is extracted and output to the allocation section 101.

Here, since a DRC signal indicating that downlink channel quality is poor is transmitted by a communication terminal at lower transmission power than in a conventional system, the probability of a DRC signal indicating that downlink channel quality is poor being received erroneously by the base station is increased. Also, as stated above, if communication resource allocation is performed based on an erroneously received DRC signal, downlink throughput will fall.

Thus, in the reception power calculation section 115, the reception power of the despread DRC signal is measured, and is output to the unused DRC detection section 116. The lowest reception power at which an error does not occur in a DRC signal indicating that downlink channel quality is poorest (a DRC signal with DRC number 1 in FIG. 4) has been set beforehand in the unused DRC detection section 116 as a threshold value. Then, in the unused DRC detection section 116, a DRC signal of reception power lower than this threshold value is detected, and the detection result is output to the allocation section 101. A DRC signal detected by the unused DRC detection section 116 is a DRC signal that is not used by the allocation section 101 in determining communication resource allocation.

In the allocation section 101, communication resource allocation to each communication terminal is determined based on the DRC signals remaining after DRC signals detected by the unused DRC detection section 116 have been excluded from the DRC signals extracted by the demodulator 114.

Thus, in a base station according to this embodiment, a DRC signal of reception power lower than the lowest reception power at which a DRC signal indicating that downlink channel quality is poorest is not received erroneously is excluded. That is to say, in abase station according to this embodiment, a notification signal susceptible to errors is excluded in determining downlink communication resource allocation. Therefore, according to a base station of this embodiment, even though a DRC signal indicating that downlink channel quality is poor is transmitted at lower transmission power than in a conventional system, it is possible to prevent communication resource allocation from being determined based on an erroneous DRC signal.

Thus, according to this embodiment, the better the downlink channel quality indicated by a DRC signal, the higher is the transmission power at which transmission is performed, and therefore it is possible to make DRC signals indicating that downlink channel quality is good proportionally less susceptible to errors, and to reduce the error occurrence rate of DRC signals for which the probability of selection by a base station is high. By this means it is possible to reduce the possibility of communication resource allocation being determined based on an erroneous DRC signal, and so to prevent a fall in downlink throughput.

Figure 5:
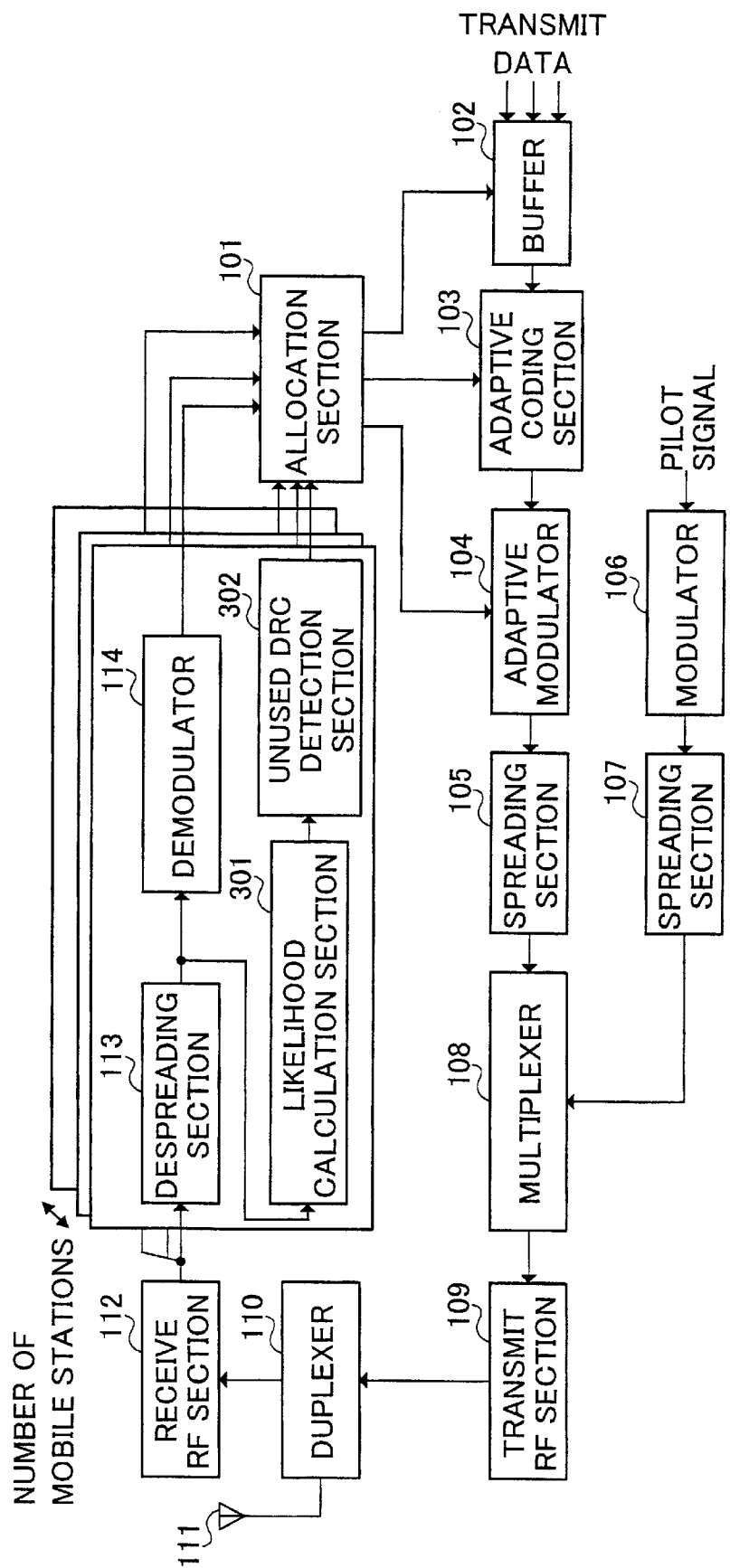
FIG. 5 is a block diagram showing another configuration of a base station according to Embodiment 1 of the present invention.

A base station according to this embodiment may also be configured as shown in FIG. 5. FIG. 5 is a block diagram showing another configuration of a base station according to Embodiment 1 of the present invention. That is to say, a base station may be configured in such a way that the reception power calculation section 115 and unused DRC detection section 116 shown in FIG. 2 are replaced by a likelihood calculation section 301 and unused DRC detection section 302. In the following description, parts identical to those in FIG. 2 are assigned the same reference numerals as in FIG. 2 and their detailed explanations are omitted.

In FIG. 5, the likelihood calculation section 301 calculates a likelihood that indicates the probable degree of certainty of a DRC signal, and outputs the calculation result to the unused DRC detection section 302. The lowest likelihood at which an error does not occur in a DRC signal indicating that downlink channel quality is poorest has been set beforehand in the unused DRC detection section 302 as a threshold value. Then, in the unused DRC detection section 302, a DRC signal with a likelihood lower than this threshold value is detected, and the detection result is output to the allocation section 101.

In this way the same kind of effect as described above is also obtained when a base station according to this embodiment is configured as shown in FIG. 5.

Embodiment 2

In a communication terminal according to Embodiment 2 of the present invention, the better the down link channel quality indicated by a DRC signal, the larger is the code word minimum distance of the code word to which that DRC signal is converted with respect to other DRC signal code words before being transmitted.

Figure 6:
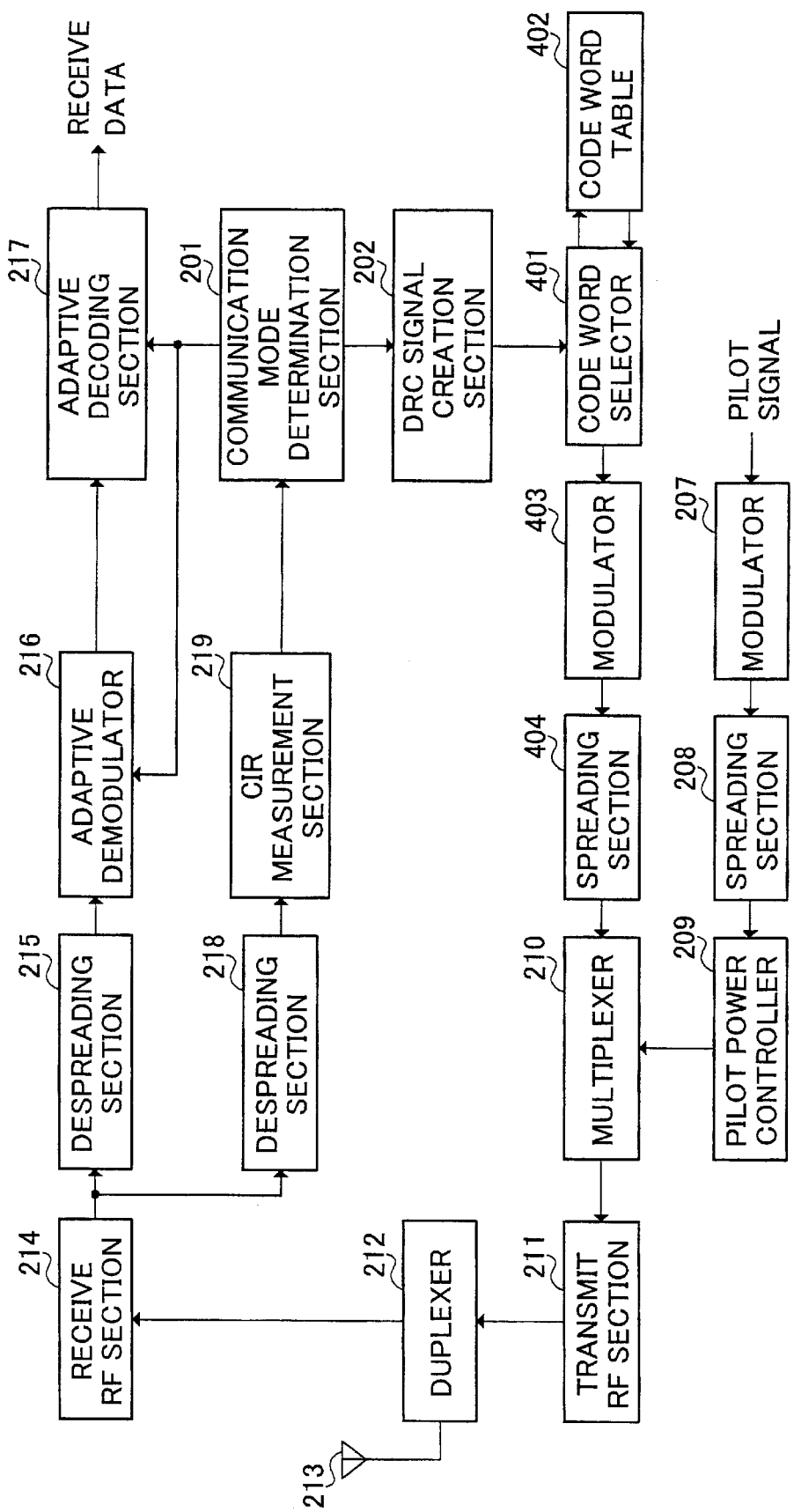
FIG. 6 is a block diagram showing the configuration of a communication terminal according to Embodiment 2 of the present invention.

FIG. 6 is a block diagram showing the configuration of a communication terminal according to Embodiment 2 of the present invention. As shown in this figure, a communication terminal according to this embodiment is configured in such away that the modulator 203, spreading section 204, DRC power controller 205, and transmission power table 206 shown in FIG. 3 are replaced by a code word selector 401, code word table 402, modulator 403, and spreading section 404. In the following description, parts identical to those in FIG. 3 are assigned the same reference numerals as in FIG. 3 and their detailed explanations are omitted.

The code word selector 401 refers to the code word table 402, converts a DRC signal created by the DRC signal creation section 202 to a predetermined code word, and outputs the code word to modulator 403. Modulator 403 modulates the code word and outputs it to spreading section 404. Spreading section 404 spreads the output signal from modulator 403 and outputs the resulting signal to a multiplexer 210.

Next, the operation of a communication terminal according to this embodiment will be described.

First, the contents set in the code word table 402 will be described. FIG. 7 is a drawing showing the contents of the code word table provided in a communication terminal according to Embodiment 2 of the present invention.

The code word table 402 shows the correspondence between DRC numbers and code words after DRC signal conversion, set so that the higher the DRC number, the larger is the code word minimum distance of the code word to which the DRC signal is converted. Here, numbers 1 to 5 are used as DRC numbers, with a higher number representing a proportionally better downlink channel quality. That is to say, in the settings in the code word table 402, the better the downlink channel quality indicated by a DRC signal, the larger is the code word minimum distance of the code word to which the DRC signal is converted.

Here, "code word distance" is the number of bits that differ between code words, and "code word minimum distance" is the minimum number of bits by which a particular code word differs with respect to all other code words. To be specific, the code word for a DRC signal with DRC number 5 is "111111111", and this code word "111111111" differs by a minimum of 6 bits when compared with any of the code words corresponding to DRC signals with DRC numbers 1 to 4. Therefore, the code word minimum distance of the code word for a DRC signal with DRC number 5 is 6. Similarly, the code word minimum distance of the code word for a DRC signal with DRC number 4 is 3.

Thus, the code word for a DRC signal with DRC number 5 is less likely to be mistaken for another code word than the code word for a DRC signal with DRC number 4. That is to say, the larger code word minimum distance of a code word, the less likely it is to be mistaken for another code word.

In the code word selector 401, a DRC signal output from the DRC signal creation section 202 is converted to a code word set in the code word table 402, and output to modulator 403. To give a specific example, if the DRC signal output from the DRC signal creation section 202 is a number 5 DRC signal, it is converted to code word "111111111".

Following conversion, the code word is modulated by modulator 403 and spread by spreading section 404. The spread code word is multiplexed with a pilot signal by a multiplexer 210, frequency-converted to radio frequency by a transmit RF section 211, and transmitted to the base station as a radio signal from an antenna 213 via a duplexer 212.

Thus, according to this embodiment, the better the downlink channel quality indicated by a DRC signal, the larger is the code word minimum distance of the code word to which that DRC signal is converted with respect to other DRC signal code words before being transmitted, and therefore it is possible to make DRC signals indicating that downlink channel quality is good proportionally less susceptible to errors, and to reduce the error occurrence rate of DRC signals for which the probability of selection by a base station is high. By this means it is possible to reduce the possibility of communication resource allocation being determined based on an erroneous DRC signal, and so to prevent a fall in downlink throughput.

Also, according to this embodiment, it is possible to reduce the error occurrence rate of DRC signals for which the probability of selection by a base station is high without increasing DRC signal transmission power, thereby making it possible to reduce the possibility of communication resource allocation being determined based on an erroneous DRC signal without increasing communication terminal power consumption.

Moreover, according to this embodiment, it is possible to change the degree of insusceptibility to errors of code words corresponding to DRC signals while keeping the code length of code words constant, and therefore it is not necessary to provide a plurality of demodulation systems in accordance with different code lengths in a base station, thus enabling the apparatus configuration of a base station to be simplified.

Embodiment 3

A base station according to Embodiment 3 of the present invention transmits to a communication terminal a control signal for table rewriting based on the rate of occurrence of DRC signals that are excluded when communication resource allocation is determined, and a communication terminal according to Embodiment 3 of the present invention rewrites the contents of a transmission power table or code word table based on a control signal transmitted from the base station.

Figure 8:
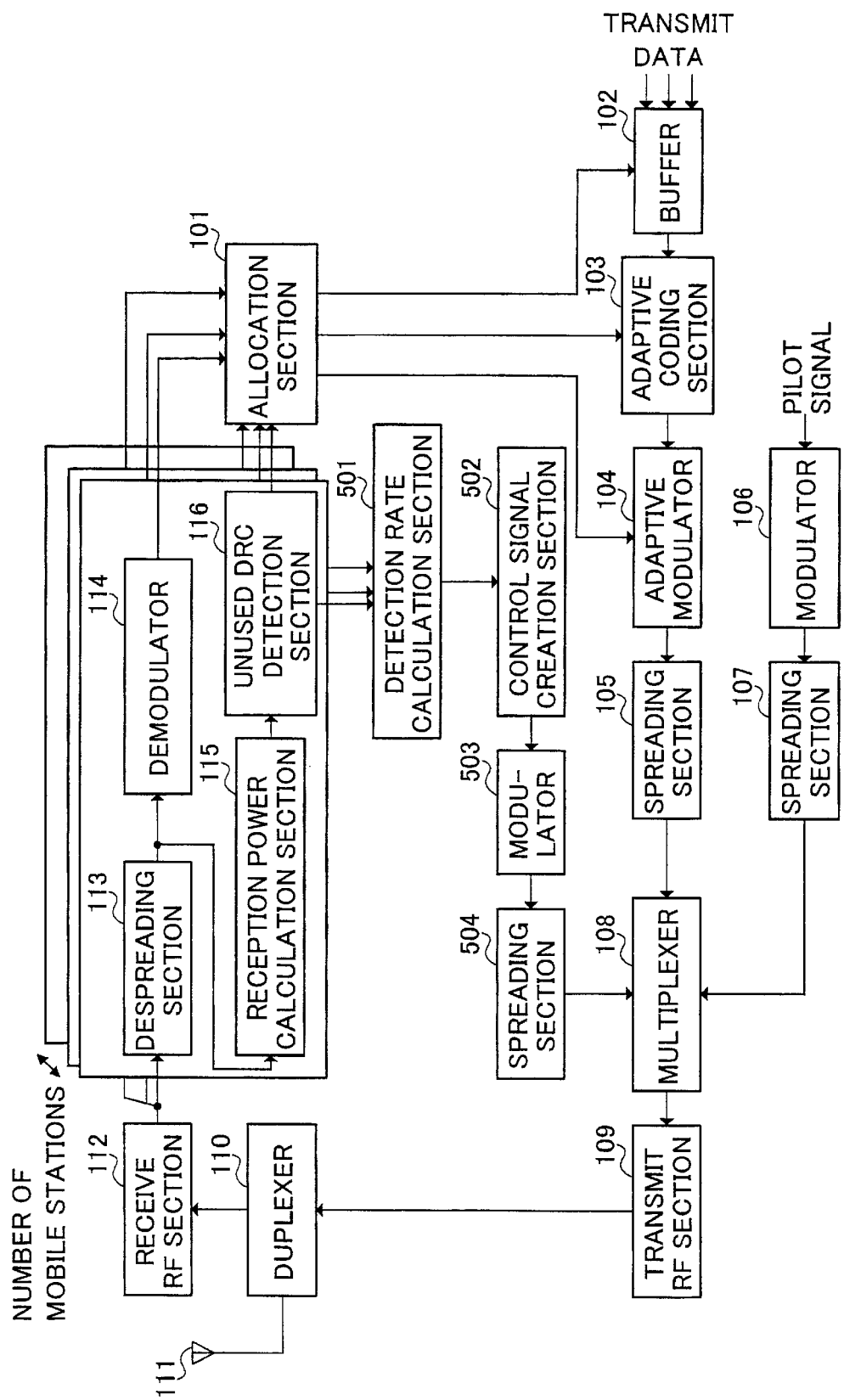
FIG. 8 is a block diagram showing the configuration of a base station according to Embodiment 3 of the present invention.

FIG. 8 is a block diagram showing the configuration of a base station according to Embodiment 3 of the present invention. As shown in this figure, a base station according to this embodiment is configured by further providing the configuration shown in FIG. 2 with a detection rate calculation section 501, control signal creation section 502, modulator 503, and spreading section 504. In the following description, parts identical to those in FIG. 2 are assigned the same reference numerals as in FIG. 2 and their detailed explanations are omitted.

In FIG. 8, the detection rate calculation section 501 calculates the rate of detection by the unused DRC detection section 116 and outputs the result to the control signal creation section 502. That is to say, the detection rate calculation section 501 calculates the rate of occurrence of DRC signals that are excluded when communication resource allocation is determined. Based on the detection rate, the control signal creation section 502 creates a control signal for table rewriting (hereinafter referred to as "table rewrite signal"), which is output to modulator 503. Modulator 503 modulates the table rewrite signal and outputs it to spreading section 504. Spreading section 504 spreads the output signal from modulator 503 and outputs the resulting signal to the multiplexer 108.

Figure 9:
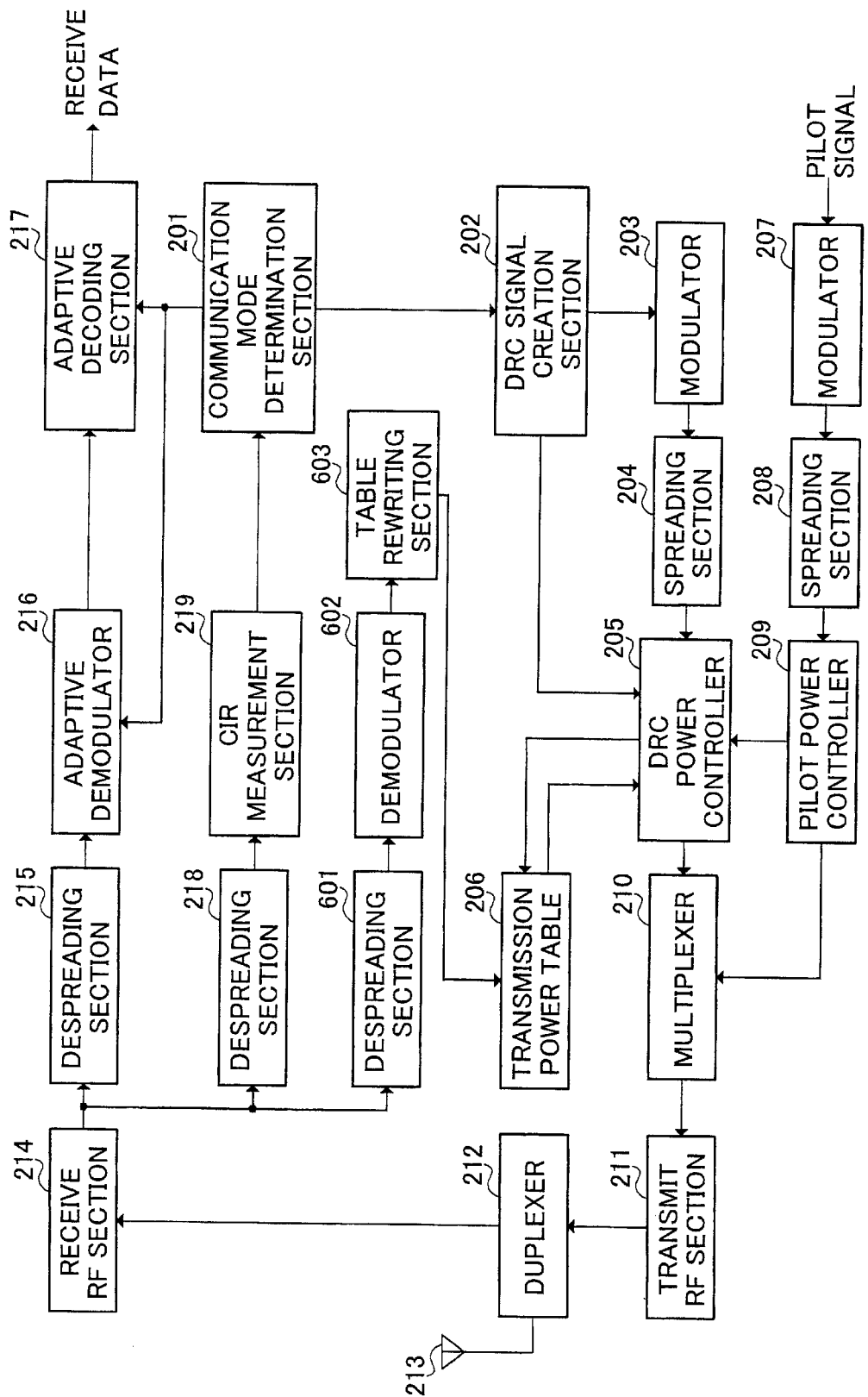
FIG. 9 is a block diagram showing the configuration of a communication terminal according to Embodiment 3 of the present invention.

FIG. 9 is a block diagram showing the configuration of a communication terminal according to Embodiment 3 of the present invention. As shown in this figure, a communication terminal according to this embodiment is configured by further providing the configuration shown in FIG. 3 with a despreading section 601, demodulator 602, and table rewriting section 603. In the following description, parts identical to those in FIG. 3 are assigned the same reference numerals as in FIG. 3 and their detailed explanations are omitted.

In FIG. 9, despreading section 601 despreads a baseband signal using the spreading code used to spread the table rewrite signal, and outputs the resulting signal to the demodulator 602. The demodulator 602 demodulates the output signal from despreading section 601 and extracts the table rewrite signal, which is output to the table rewriting section 603. The table rewriting section 603 rewrites the contents of the transmission power table in accordance with the table rewrite signal.

Next, the procedure for transmission/reception of signals between the base station shown in FIG. 8 and the communication terminal shown in FIG. 9 will be described.

First, in the detection rate calculation section 501 of the base station, the detection rate of the unused DRC detection section 116 is calculated and is output to the control signal creation section 502. The detection rate can be calculated, for example, from the number of detections in a predetermined time.

A predetermined threshold value for the detection rate has been set in the control signal creation section 502, and this threshold value is compared with the detection rate calculated by the detection rate calculation section 501. If the detection rate calculated by the detection rate calculation section 501 is greater than or equal to the threshold value, a table rewrite signal ordering all transmission power values set in the transmission power table 206 to be increased is created, and is output to modulator 503. That is to say, if the rate of occurrence of DRC signals that are excluded when communication resource allocation is determined is greater than or equal to the predetermined threshold value, the control signal creation section 502 creates a table rewrite signal that orders all DRC signal transmission power values to be increased simultaneously from their current values.

The table rewrite signal is modulated by modulator 503, spread by spreading section 504, and output to the multiplexer 108. The spread table rewrite signal is multiplexed with transmit data and the pilot signal in the multiplexer 108, frequency-converted to radio frequency by the transmit RF section 109, and transmitted to communication terminals as a radio signal from the antenna 111 via the duplexer 110.

The radio signal transmitted from the base station is received by the antenna 213 of the communication terminal, passes through the duplexer 212, and is frequency-converted to baseband by the receive RF section 214. The baseband signal is despread by despreading section 601 and demodulated by the demodulator 602, and the table rewrite signal is extracted. The extracted table rewrite signal is output to the table rewriting section 603.

The contents of the transmission power table 206 are then rewritten by the table rewriting section 603 in accordance with the table rewrite signal. That is to say, the table rewriting section 603 increases all the transmission power values set in the transmission power table 206.

In the above description, the configuration is such that the table rewriting section 603 rewrites the contents of the transmission power table 206, but this embodiment may also be applied to a communication terminal according to Embodiment 2, and a configuration may be used whereby the table rewriting section 603 rewrites the contents of the code word table 402 shown in FIG. 6.

In this case, if the detection rate calculated by the detection rate calculation section 501 is greater than or equal to the threshold value, the control signal creation section 502 of a base station according to this embodiment creates a table rewrite signal ordering all code word minimum distances set in the code word table 402 to be increased. That is to say, if the rate of occurrence of DRC signals that are excluded when communication resource allocation is determined is greater than or equal to the predetermined threshold value, the control signal creation section 502 creates a table rewrite signal that orders all code word minimum distances of code words corresponding to DRC signals to be increased simultaneously from their current values. Then the table rewriting section 603 rewrites the contents of the code word table 402 in accordance with the table rewrite signal. That is to say, the table rewriting section 603 rewrites the code words set in the code word table 402 with code words all of whose code word minimum distances are larger than at present.

Thus, according to this embodiment, the contents of the transmission power table or code word table are rewritten based on the rate of occurrence of DRC signals that are excluded when communication resource allocation is determined. In other words, in this embodiment, transmission power table or code word table contents are rewritten adaptively in accordance with variations in the communication environment. That is to say, according to this embodiment, when the communication environment deteriorates and the rate of occurrence of DRC signals that are excluded when communication resource allocation is determined reaches or exceeds a predetermined threshold value, the transmission power of each DRC signal is increased, or the code word minimum distance of the code word corresponding to each DRC signal is increased, thereby enabling the DRC signal error occurrence rate to be held down even when the communication environment deteriorates.

In this embodiment, the predetermined detection rate threshold value is decided upon considering appropriately the environment in which the communication system is used.

Moreover, with this embodiment, it is also possible to further set a second predetermined threshold value in the control signal creation section 502 to create a table rewrite signal ordering all transmission power values set in the transmission power table 206 to be decreased when the detection rate calculated by the detection rate calculation section 501 falls below this second threshold value. By this means, it is possible to reduce DRC signal transmission power when DRC signal reception quality becomes excessive, thereby enabling communication terminal power consumption to be decreased.

Furthermore, in this embodiment, table rewriting is performed based on the rate of detection by the unused DRC detection section 116, but it is also possible to rewrite a table based on the distribution of DRC signals used in determining communication resource allocation from among DRC signals transmitted from mobile stations, so that that distribution is optimized. In this case, the base station shown in FIG. 8 is configured with the detection rate calculation section replaced by a used DRC distribution determination section, which determines the distribution of DRC signals used in communication resource allocation determination based on DRC signals output from the demodulator 114 and detection results output from the unused DRC detection section 116, and outputs a signal indicating that distribution to the control signal creation section 502. The control signal creation section 502 then creates a table rewrite signal based on the signal indicating the distribution output from the used DRC distribution determination section.

Embodiment 4

A communication terminal according to Embodiment 4 of the present invention transmits at higher transmission power in proportion to CIR information that indicates that downlink channel quality is good. A base station according to Embodiment 4 of the present invention excludes CIR information for which the reception power is lower than a predetermined threshold value in performing communication resource allocation.

In above-described Embodiment 1, a communication terminal determines the communication mode based on the CIR and transmits a DRC signal corresponding to that determined communication mode to the base station at predetermined transmission power, and the base station determines communication resource allocation to each communication terminal based on the DRC signals. DRC signal can be represented with far fewer bits than other information indicating downlink channel quality (such as a downlink CIR, for example), and therefore use of a DRC signal has the advantage of enabling the downlink channel utilization efficiency to be increased. On the other hand, since a communication terminal must be provided with a table for communication mode determination, a table for DRC signal creation, and so forth to determine the communication mode and create a DRC signal, there are the disadvantages of increased communication terminal power consumption and apparatus size.

Thus, in this embodiment, a communication terminal transmits CIR information to the base station at predetermined transmission power, and the base station determines the communication mode based on the CIR information and then determines communication resource allocation to each communication terminal. As a result, although there is the disadvantage of a slight decrease in the uplink channel utilization efficiency, the fact that communication terminals do not have to determine the communication mode and create a DRC signal, and do not need to be provided with a communication mode determination table, DRC signal creation table, and so forth, offers the major advantage of enabling communication terminal power consumption and apparatus size to be reduced. Also, in this embodiment, it is possible for CIR information for a plurality of terminals to be compared in the base station, and the correct communication mode to be determined with certainty, making this embodiment particularly useful in cases such as those where it is not possible for the communication mode to be determined simply from the CIR in each communication terminal.

Figure 10:
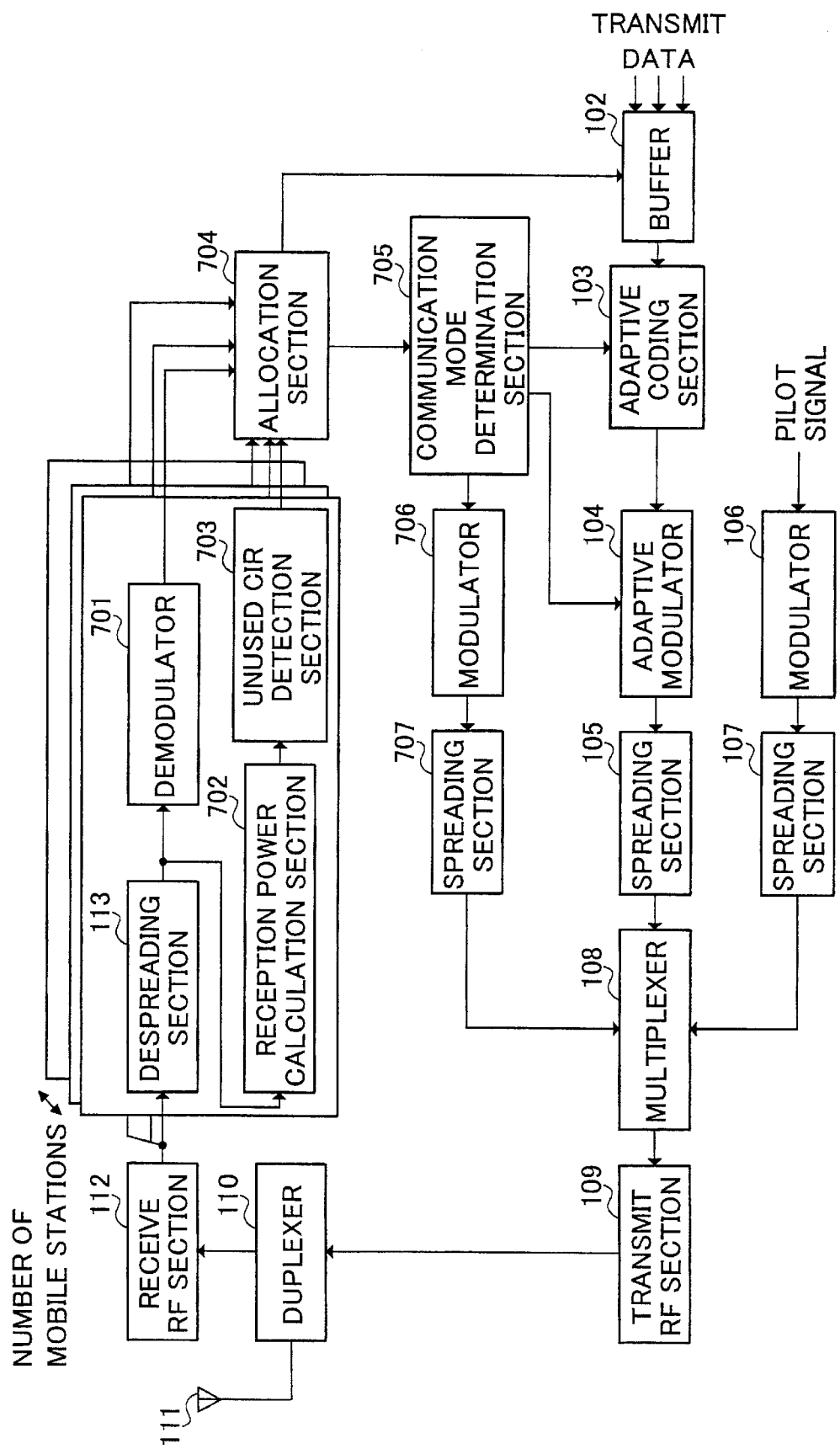
FIG. 10 is a block diagram showing a configuration of a base station according to Embodiment 4 of the present invention.

A base station according to this embodiment and a communication terminal according to this embodiment will be described below. FIG. 10 is a block diagram showing a configuration of a base station according to Embodiment 4 of the present invention. In the following description, parts identical to those in FIG. 2 are assigned the same reference numerals as in FIG. 2 and their detailed explanations are omitted.

In FIG. 10, a demodulator 701 demodulates the output signal from a despreading section 113, and extracts a signal that contains CIR information (hereinafter referred to as "CIR signal"), which is output to an allocation section 704.

A reception power calculation section 702 measures the reception power of the despread CIR signal, which is output to an unused CIR detection section 703. In the unused CIR detection section 703 is set a predetermined threshold value in the same way as in Embodiment 1, and a CIR signal of reception power lower than this threshold value is detected, and the result of the detection is output to the allocation section 704.

A despreading section 113, demodulator 701, reception power calculation section 702, and unused CIR detection section 703 are provided for each communication terminal. From each demodulator 701 a CIR signal for the corresponding communication terminal is output, and from each unused CIR detection section 703 a detection result for the corresponding communication terminal is output.

The allocation section 704 determines communication resource allocation to each communication terminal based on CIR information indicated by CIR signals excluding CIR signals detected by the unused CIR detection sections 703 from among the CIR signals extracted by the demodulators 701. Then, based on the determined communication resource allocation, the allocation section 704 notifies a buffer 102 for output of downlink transmit data, and outputs the CIR information to a communication mode determination section 705.

Based on the CIR information output from the allocation section 704, the communication mode determination section 705 determines the communication mode, which indicates a combination of modulation method and coding method, and outputs a signal indicating this communication mode to a modulator 706. In addition, based on the determined communication mode, the communication mode determination section 705 indicates the downlink transmit data coding method to an adaptive coding section 103, and indicates the downlink transmit data modulation method to an adaptive modulator 104. Modulator 706 modulates the signal indicating the communication mode and outputs it to a spreading section 707. Spreading section 707 spreads the output signal from modulator 706 and outputs the resulting signal to a multiplexer 108.

Figure 11:
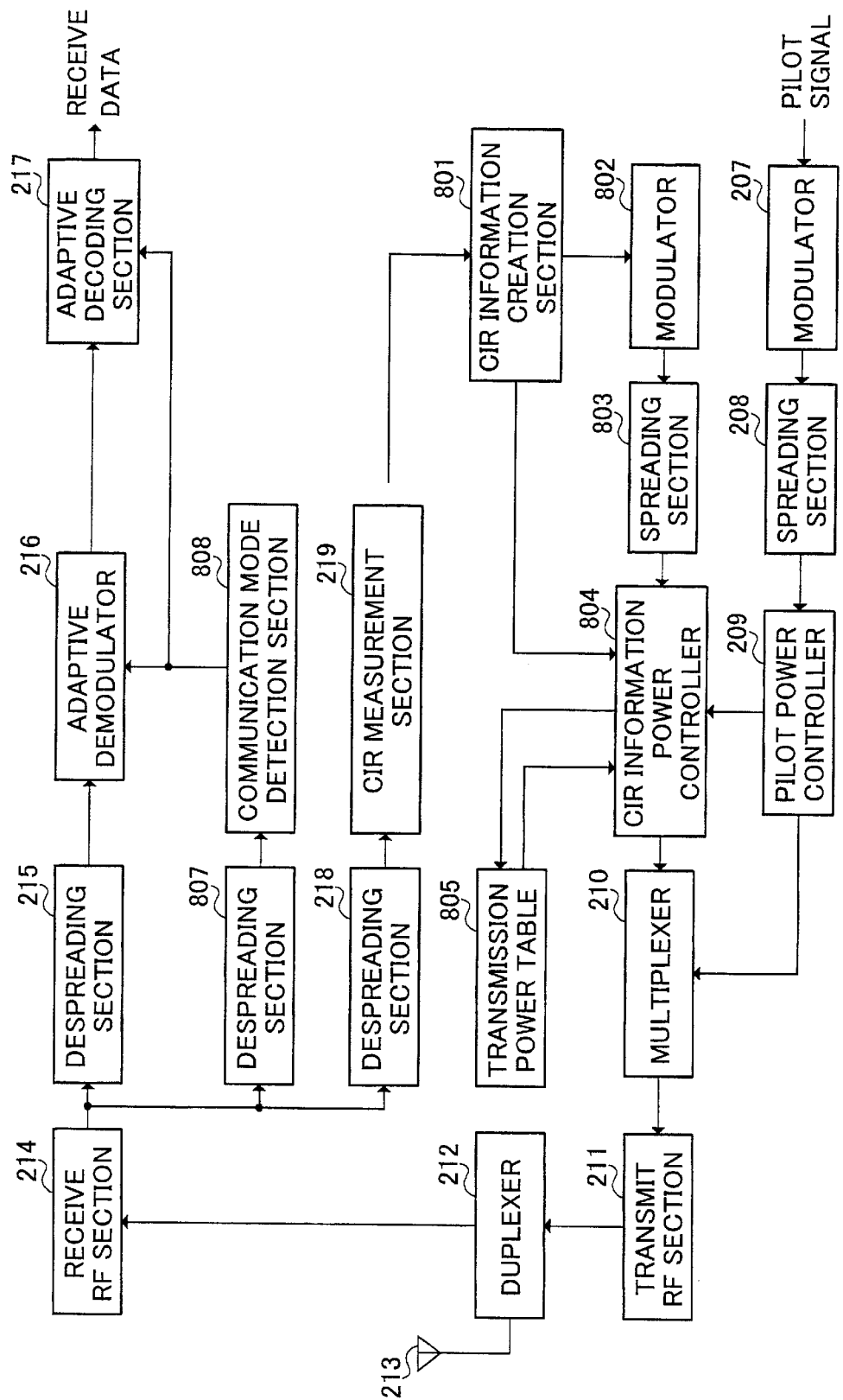
FIG. 11 is a block diagram showing the configuration of a communication terminal according to Embodiment 4 of the present invention.

FIG. 11 is a block diagram showing the configuration of a communication terminal according to Embodiment 4 of the present invention. In the following description, parts identical to those in FIG. 3 are assigned the same reference numerals as in FIG. 3 and their detailed explanations are omitted.

In FIG. 11, a CIR information creation section 801 creates a CIR signal indicating a CIR measured by a CIR measurement section 219, and outputs it to a modulator 802 and CIR information power controller 804. Modulator 802 modulates the CIR signal and outputs it to a spreading section 803. Spreading section 803 spreads the output signal from modulator 802 and outputs the spread signal to the CIR information power controller 804. The CIR information power controller 804 refers to a transmission power table 805 that shows the correspondence between CIR level and transmission power, and controls the CIR signal transmission power based on the transmission power of a pilot signal output from a pilot power controller 209, and outputs the CIR signal that has undergone transmission power control to a multiplexer 210.

A despreading section 807 despreads the baseband signal using the spreading code used to spread the signal indicating the communication mode, and outputs the despread signal to a communication mode detection section 808. The communication mode detection section 808 demodulates the output signal from despreading section 807 and detects the communication mode. Then, based on the detected communication mode, the communication mode detection section 808 indicates the downlink receive data demodulation method to an adaptive demodulator 216 and indicates the downlink receive data decoding method to an adaptive decoding section 217.

Next, the procedure for transmission/reception of signals between the base station shown in FIG. 10 and the communication terminal shown in FIG. 11 will be described.

First, in the communication terminal shown in FIG. 11, the CIR of the pilot signal output from despreading section 218 is measured by the CIR measurement section 219, and a CIR signal is created by the CIR information creation section 801.

The CIR signal is modulated by modulator 802, spread by spreading section 803, and output to the CIR information power controller 804. In the transmission power table 805, the correspondence between CIR level and CIR signal transmission power is shown in the same way as in Embodiment 1, set so that the CIR signal transmission power increases in proportion to the level of the CIR. That is to say, in the settings in transmission power table 805, as in Embodiment 1, the better the downlink channel quality indicated by a CIR signal, the higher is the transmission power. Also, as in Embodiment 1, the CIR signal transmission power values set in the transmission power table 805 are expressed as a ratio to the pilot signal transmission power.

In the CIR information power controller 804, the CIR signal transmission power is obtained by having the transmission power of the pilot signal output from the pilot power controller 209 adjusted in accordance with the ratios set in the transmission power table 805. Then, in the CIR information power controller 804, the transmission power of the CIR signal output from spreading section 803 is adjusted to this obtained transmission power, and a CIR signal that has been subjected to transmission power control is output to the multiplexer 210.

The CIR signal that has under gone transmission power control is multiplexed with the pilot signal by the multiplexer 210, frequency-converted to radio frequency by a transmit RF section 211, and transmitted to the base station as a radio signal from an antenna 213 via a duplexer 212.

In the base station shown in FIG. 10, the output signal from the despreading section 113 is demodulated by demodulator 701, and the demodulated CIR signal is extracted and output to the allocation section 704. In the reception power calculation section 702, the reception power of the despread CIR signal is measured, and is output to the unused CIR detection section 703. The lowest reception power at which an error does not occur in a CIR signal indicating that downlink channel quality is poorest has been set beforehand in the unused CIR detection section 703 as a threshold value, as in Embodiment 1. Then, in the unused CIR detection section 703, a CIR signal of reception power lower than this threshold value is detected, and the detection result is output to the allocation section 704. A CIR signal detected by the unused CIR detection section 703 is a CIR signal that is not used by the allocation section 704 in determining communication resource allocation.

In the allocation section 704, communication resource allocation to each communication terminal is determined based on the CIR shown by CIR signals remaining after CIR signals detected by the unused CIR detection section 703 have been excluded from the CIR signals extracted by the demodulator 701, and CIR information is output to the communication mode determination section 705.

In the communication mode determination section 705, the communication mode is determined based on CIR information output from the allocation section 704, and a signal indicating this communication mode is output to modulator 706. The signal indicating the communication mode is modulated by modulator 706, spread by spreading section 707, multiplexed with transmit data and the pilot signal in the multiplexer 108, frequency-converted to radio frequency by the transmit RF section 109, and transmitted to the communication terminal as a radio signal from an antenna 111 via a duplexer 110.

In the communication terminal shown in FIG. 11, a baseband signal is despread by despreading section 807, and the despread signal is output to the communication mode detection section 808. In the communication mode detection section 808, the output signal from despreading section 807 is demodulated and the communication mode is detected, and based on the detected communication mode, the downlink receive data demodulation method is indicated to the adaptive demodulator 216 and the downlink receive data decoding method is indicated to the adaptive decoding section 217.

Thus, according to this embodiment, as in Embodiment 1, the better the downlink channel quality indicated by a CIR signal, the higher is the transmission power at which transmission is performed, and therefore it is possible to reduce the error occurrence rate of CIR information for which the probability of use by a base station is high. By this means it is possible to reduce the possibility of communication resource allocation being determined based on erroneous CIR information, and so to prevent a fall in downlink throughput.

Also, according to this embodiment, as in Embodiment 1, a CRI signal of reception power lower than the lowest reception power at which a CIR signal indicating that downlink channel quality is poorest is not received erroneously is excluded, and therefore, even though a CIR signal indicating that downlink channel quality is poor is transmitted at lower transmission power than in a conventional system, it is possible to prevent communication resource allocation from being determined based on erroneous CIR information.

Figure 12:
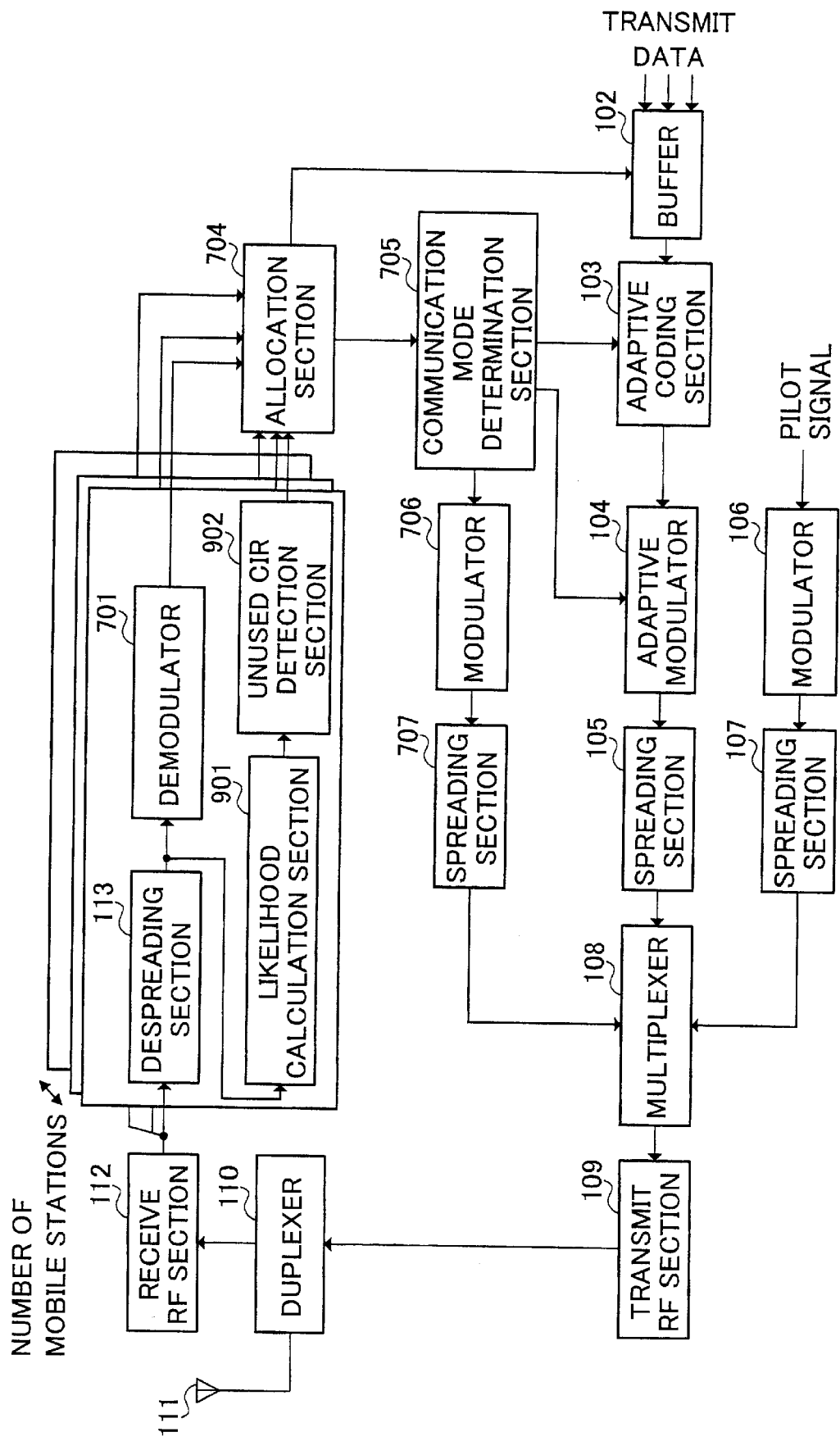
FIG. 12 is a block diagram showing another configuration of a base station according to Embodiment 4 of the present invention.

A base station according to this embodiment may also be configured as shown in FIG. 12. FIG. 12 is a block diagram showing another configuration of a base station according to Embodiment 4 of the present invention. That is to say, a base station may be configured in such a way that the reception power calculation section 702 and unused CIR detection section 703 shown in FIG. 10 are replaced by a likelihood calculation section 901 and unused CIR detection section 902. In the following description, parts identical to those in FIG. 10 are assigned the same reference numerals as in FIG. 10 and their detailed explanations are omitted.

In FIG. 12, the likelihood calculation section 901 calculates a likelihood that indicates the probable degree of certainty of a CRI signal, and outputs the calculation result to the unused CIR detection section 902. The lowest likelihood at which an error does not occur in a CIR signal indicating that downlink channel quality is poorest has been set beforehand in the unused CIR detection section 902 as a threshold value. Then, in the unused CIR detection section 902, a CIR signal with a likelihood lower than this threshold value is detected, and the detection result is output to the allocation section 704.

In this way the same effect as described above is also obtained when a base station according to this embodiment is configured as shown in FIG. 12.

Embodiment 5

In a communication terminal according to Embodiment 5 of the present invention, the better the downlink channel quality indicated by a CIR signal, the larger is the code word minimum distance of the code word to which that CIR signal is converted with respect to other CIR signal code words before being transmitted.

Figure 13:
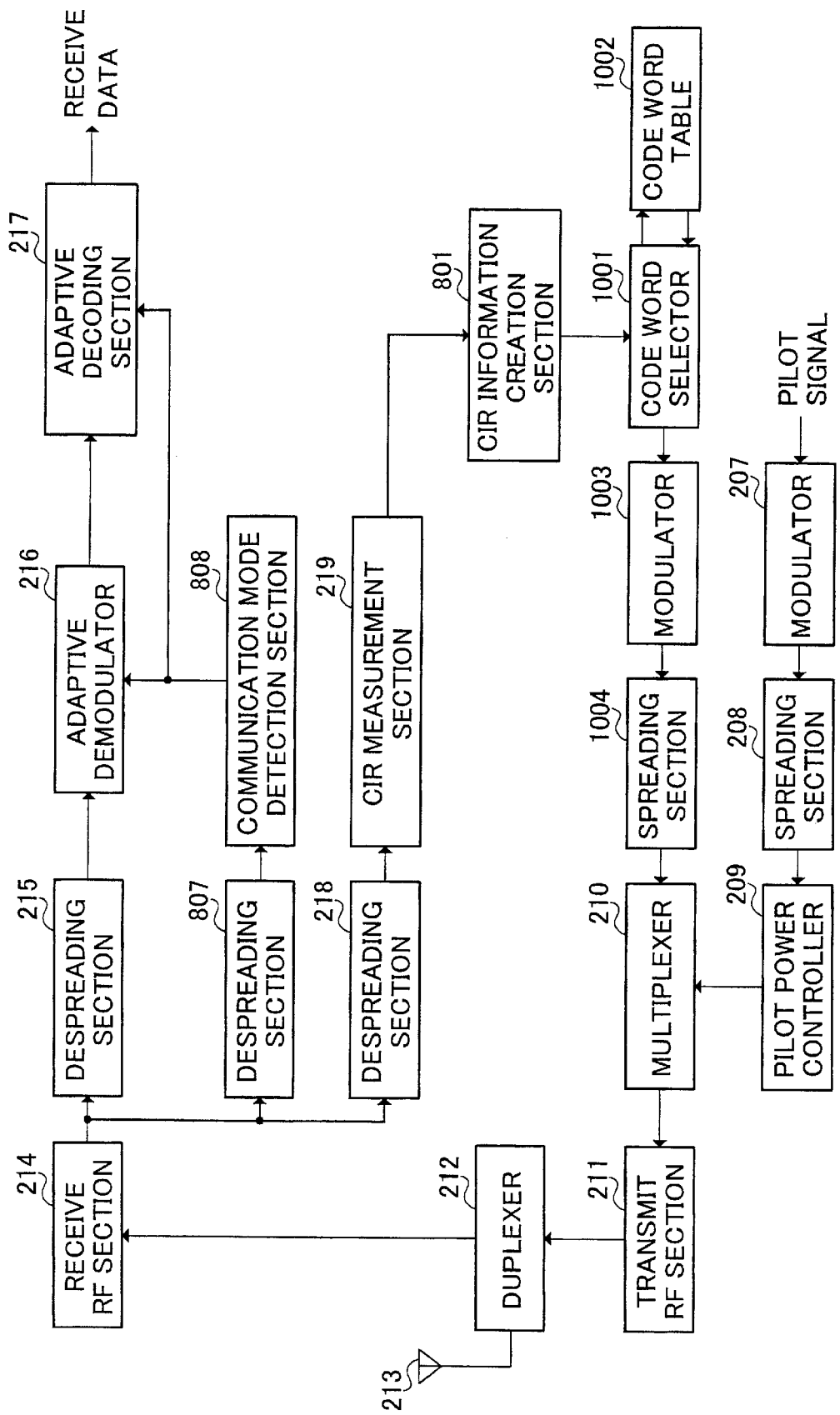
FIG. 13 is a block diagram showing the configuration of a communication terminal according to Embodiment 5 of the present invention.

FIG. 13 is a block diagram showing the configuration of a communication terminal according to Embodiment 5 of the present invention. As shown in this figure, a communication terminal according to this embodiment is configured in such away that the modulator 802, spreading section 803, CIR information power controller 804, and transmission power table 805 shown in FIG. 11 are replaced by a code word selector 1001, code word table 1002, modulator 1003, and spreading section 1004. In the following description, parts identical to those in FIG. 11 are assigned the same reference numerals as in FIG. 11 and their detailed explanations are omitted.

The code word selector 1001 refers to the code word table 1002, converts a CIR signal created by the CIR information creation section 801 to a predetermined code word, and outputs it to modulator 1003. Modulator 1003 modulates the code word and outputs it to spreading section 1004. Spreading section 1004 spreads the output signal from modulator 1003 and outputs the resulting signal to a multiplexer 210.

Next, the operation of a communication terminal according to this embodiment will be described.

In the same way as in above-described Embodiment 2, the code word table 1002 shows the correspondence between CIR level and code words after CIR signal conversion, set so that the higher the CIR level, the larger is the code word minimum distance of the code word to which the CIR signal is converted. That is to say, in the settings in the code word table 1002, the better the downlink channel quality indicated by a CIR signal, the larger is the code word minimum distance of the code word to which the CIR signal is converted.

In the code word selector 1001, a CIR signal output from the CIR information creation section 801 is converted to a code word set in the code word table 1002, and output to modulator 1003. Following conversion, the code word is modulated by modulator 1003 and spread by spreading section 1004. The spread code word is multiplexed with a pilot signal by a multiplexer 210, frequency-converted to radio frequency by a transmit RF section 211, and transmitted to the base station as a radio signal from an antenna 213 via a duplexer 212.

Thus, according to this embodiment, as in Embodiment 2, the better the downlink channel quality indicated by a CIR signal, the larger is the code word minimum distance of the code word to which that CIR signal is converted with respect to other CIR signal code words before being transmitted, and therefore it is possible to reduce the error occurrence rate of CIR information for which the probability of use by a base station is high. By this means it is possible to reduce the possibility of communication resource allocation being determined based on erroneous CIR information, and so to prevent a fall in downlink throughput.

Also, according to this embodiment, as in Embodiment 2, it is possible to reduce the error occurrence rate of CIR information for which the probability of use by a base station is high without increasing CIR signal transmission power, thereby making it possible to reduce the possibility of communication resource allocation being determined based on erroneous CIR information without increasing communication terminal power consumption.

Moreover, according to this embodiment, as in Embodiment 2, it is possible to change the degree of insusceptibility to errors of code words corresponding to CIR signals while keeping the code length of code words constant, and therefore it is not necessary to provide a plurality of demodulation systems in accordance with different code lengths in a base station, thus enabling the apparatus configuration of a base station to be simplified.

Embodiment 6

A communication terminal according to Embodiments 6 to 8 of the present invention transmits with less susceptibility to errors in the propagation path in proportion to information for which the amount of change is large within CIR information. In other words, a communication terminal according to Embodiments 6 to 8 of the present invention transmits with less susceptibility to errors in the propagation path in proportion to information that indicates a broad value within CIR information.

The meaning of "information for which the amount of change is large" and "information that indicates a broad value" here can be illustrated by a specific example. If a CIR value is indicated by a value with a decimal fraction (such as 8.7 dB), then the above-mentioned information refers to the integer part (here, "8"). In this case, since the amount of change per unit of the integer part is 1 dB, while the amount of change per unit of the fractional part is 0.1 dB, the integer part is "information for which the amount of change is large". Therefore, if an integer part is received erroneously by a base station, the degree of error is large compared with the case where a fractional part is received erroneously, and the probability of an erroneous communication mode being determined is higher-that is to say, the probability of downlink throughput falling is higher.

Also, CIR information is normally converted to a code word with a limited number of bits before being transmitted to a base station, and there are also limits on the transmission power and spreading code spreading factor that can be used in transmitting CIR information. There are thus limits to making CIR information overall insusceptible to errors, and it is difficult to do so.

Thus, in Embodiments 6 to 8 of the present invention, within the above-described limitations on transmission of CIR information, transmission is performed with insusceptibility to errors in the propagation path made proportional to "information for which the amount of change is large" within the above limitations so that, at least "information for which the amount of change is large" (that is, "information that indicates a broad value") of CIR information is received correctly.

A communication terminal according to Embodiment 6 of the present invention is described below. A communication terminal according to Embodiment 6 of the present invention performs conversion to, and transmits, a code word with a code length proportional to the value of the upper digit in a CIR value.

Figure 14:
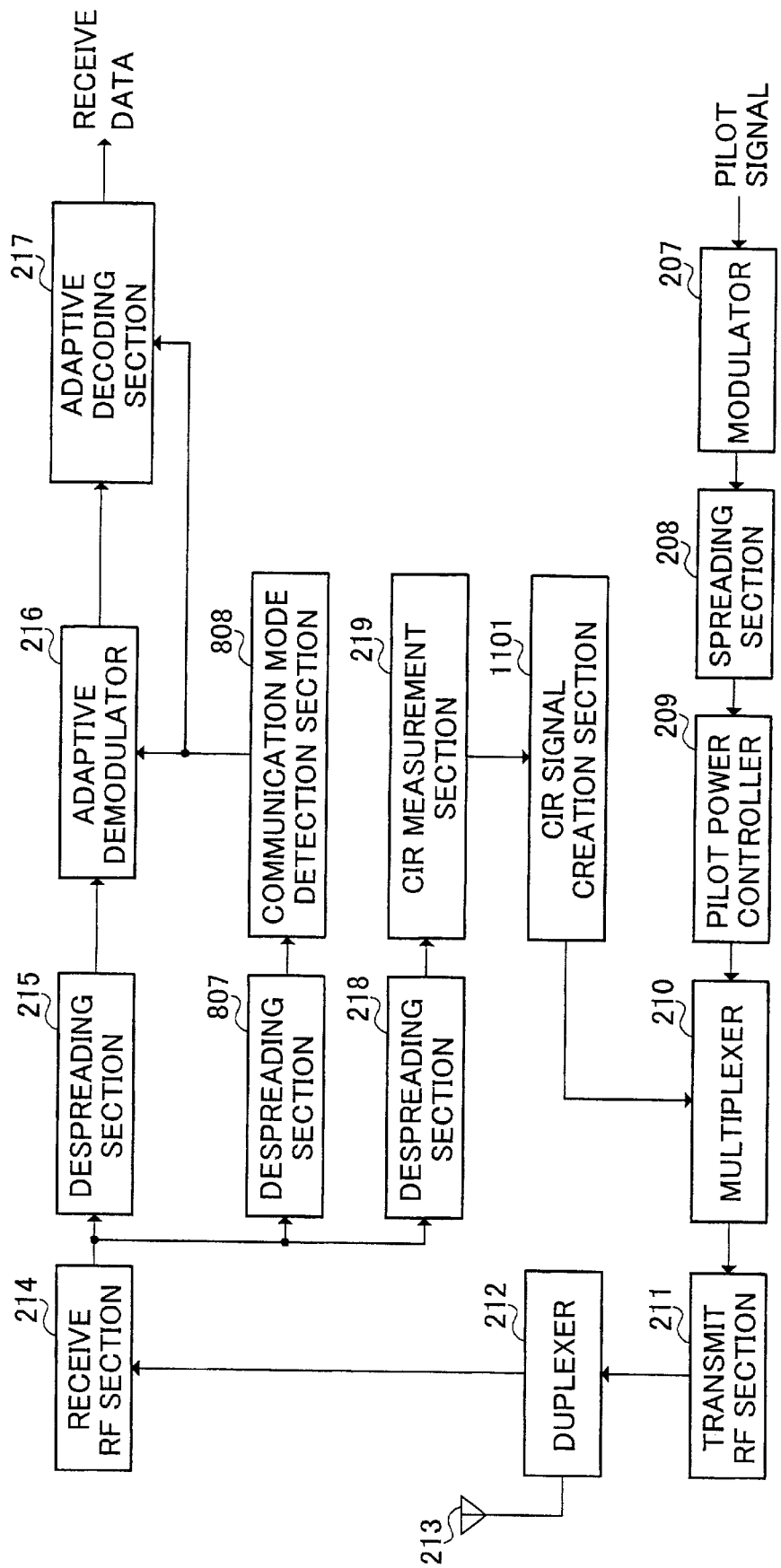
FIG. 14 is a block diagram showing the configuration of a communication terminal according to Embodiment 6 of the present invention.

FIG. 14 is a block diagram showing the configuration of a communication terminal according to Embodiment 6 of the present invention. In the following description, parts identical to those in FIG. 11 are assigned the same reference numerals as in FIG. 11 and their detailed explanations are omitted.

In FIG. 14, a CIR signal creation section 1101 converts a CIR value measured by a CIR measurement section 219 to a code word and creates a CIR signal, and outputs the created CIR signal to a multiplexer 210. At this time, the CIR signal creation section 1101 creates a CIR signal by performing conversion to a code word with a code length proportional to the value of the upper digit in the CIR value.

Figure 15:
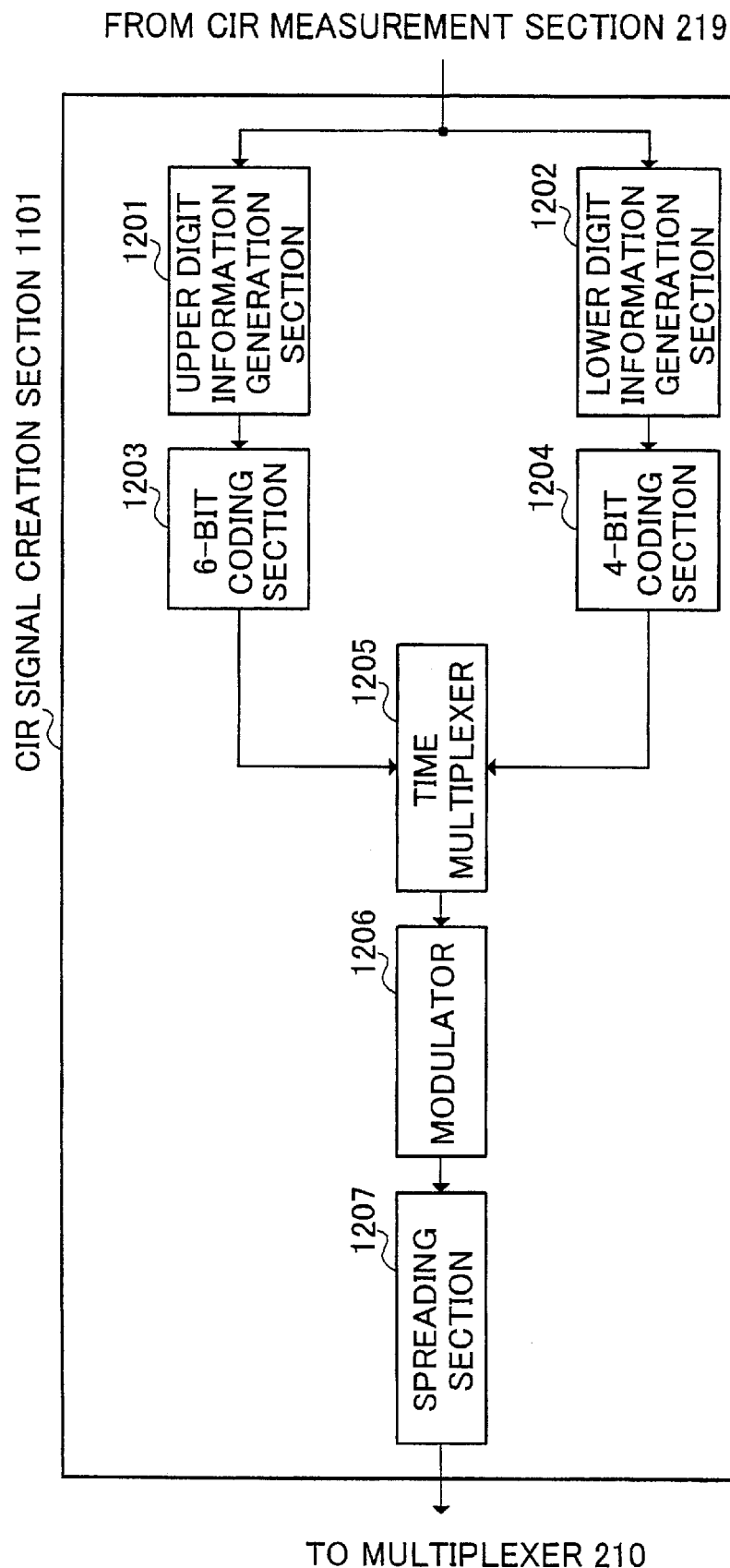
FIG. 15 is a block diagram showing the configuration of the CIR signal creation section of a communication terminal according to Embodiment 6 of the present invention.

Next, the configuration of the CIR signal creation section 1101 will be described. FIG. 15 is a block diagram showing the configuration of the CIR signal creation section of a communication terminal according to Embodiment 6 of the present invention.

In FIG. 15, an upper digit information generation section 1201 outputs the value of the upper digit in the CIR value output from the CIR measurement section 219 to a 6-bit coding section 1203. A lower digit information generation section 1202 outputs the value of the lower digit in the CIR value output from the CIR measurement section 219 to a 4-bit coding section 1204. To give a specific example, if the CIR value output from the CIR measurement section 219 is 8.7 dB, the upper digit information generation section 1201 outputs the value of the integer part, "8", to the 6-bit coding section 1203, and the lower digit information generation section 1202 outputs the value of the fractional part, "7", to the 4-bit coding section 1204.

The 6-bit coding section 1203 converts the value output from the upper digit information generation section 1201 (here, "8") to a 6-bit code word, and outputs the 6-bit code word to a time multiplexer 1205. The 4-bit coding section 1204 converts the value output from the lower digit information generation section 1202 (here, "7") to a 4-bit code word, and outputs the 4-bit code word to the time multiplexer 1205. It is herein assumed that the number of bits that can be used to indicate a CIR value is ten.

The time multiplexer 1205, by storing the 6-bit code word in the first half of a slot and storing the 4-bit code word in the following latter half of the slot, performs time multiplexing of the code word for the integer part of the CIR value (that is, the code word corresponding to the value of the upper digit) and the code word for the fractional part of the CIR value (that is, the code word corresponding to the value of the lower digit). The time multiplexer 1205 then outputs the time-multiplexed 10-bit code word to a modulator 1206 as a CIR signal. It is herein assumed that one slot is composed of 10 bits, with the integer part of a CIR value represented by the preceding 6 bits and the fractional part of a CIR value represented by the succeeding 4 bits.

The modulator 1206 modulates the CIR signal and outputs it to the spreading section 1207. The spreading section 1207 spreads the output signal from the modulator 1206 and outputs the resulting signal to the multiplexer 210.

Next, the operation of a communication terminal with the above configuration will be described.

In the 6-bit coding section 1203, the value of the upper digit in the CIR value (here, "8") is converted to a 6-bit code word, and the value of the lower digit in the CIR value (here, "7") is converted to a 4-bit code word.

As the number of different code words that can be represented by 6 bits is $2^6$, and the number of different code words that can be represented by 4 bits is $2^4$, the code word minimum distance between code words can be made larger for code words represented by 6 bits. Therefore, a code word represented by 6 bits is less susceptible to being mistaken for another code word than a code word represented by 4 bits. That is to say, in this embodiment, the value of the upper digit of a CIR value is less susceptible to errors.

Thus, with a communication terminal according to this embodiment, within the limitation of 10 bits available to indicate a CIR value, by performing conversion to a code word of a code length proportional to the value of the upper digit in a CIR value, it is possible to perform transmission with insusceptibility to errors made proportional to the value of the upper digit for which the amount of change is large. By this means, even if an error should occur in a CIR signal in the propagation path, the probability of being able to perform reception correctly at the base station is proportionally higher according to the value of the upper digit in a CIR value, and the degree of error in CIR values can be kept low. Thus, it is possible to reduce the possibility of an erroneous communication mode being determined in the base station.

In this embodiment, a case has been described where the upper digit value is converted to a 6-bit code word and the lower digit value is converted to a 4-bit code word. However, as long as the number of bits of the code word corresponding to the upper digit value is greater than the number of bits of the code word corresponding to the lower digit value, there are no particular limitations on these numbers of bits.

Embodiment 7

A communication terminal according to Embodiment 7 of the present invention transmits with transmission power increased in proportion to the value of the upper digit in a CIR value.

A communication terminal according to this embodiment differs from a communication terminal according to Embodiment 6 only in the internal configuration of the CIR signal creation section 1101, and therefore only the CIR signal creation section 1101 will be described in the following description.

Figure 16:
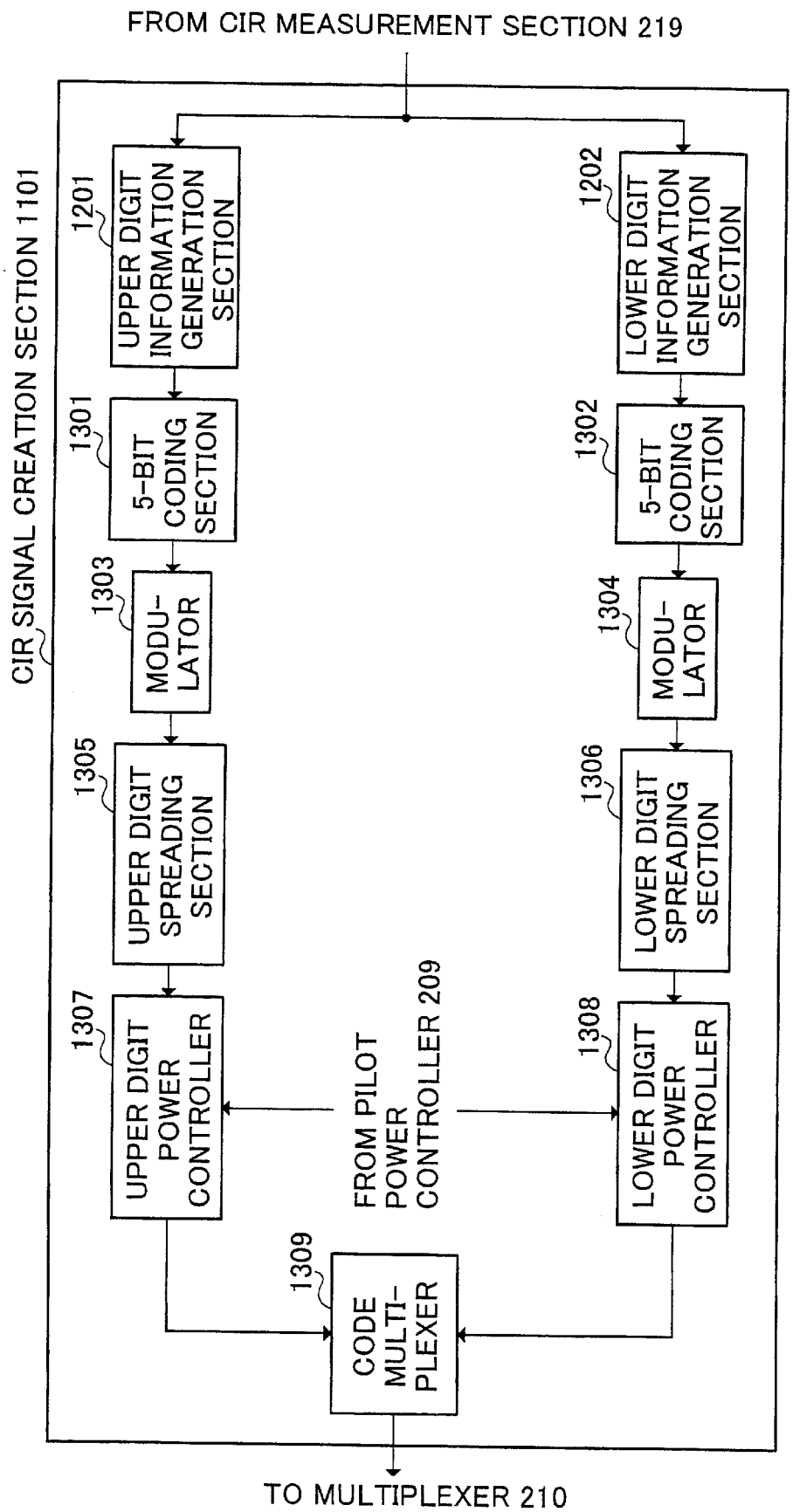
FIG. 16 is a block diagram showing the configuration of the CIR signal creation section of a communication terminal according to Embodiment 7 of the present invention.

FIG. 16 is a block diagram showing the configuration of the CIR signal creation section of a communication terminal according to Embodiment 7 of the present invention. In the following description, parts identical to those in FIG. 15 are assigned the same reference numerals as in FIG. 15 and their detailed explanations are omitted.

The CIR signal creation section 1101 shown in FIG. 16 converts a CIR value measured by a CIR measurement section 219 to a code word, and then creates a CIR signal, increasing transmission power in proportion to the value of the upper digit.

In FIG. 16, a 5-bit coding section 1301 converts the value output from an upper digit information generation section 1201 to a 5-bit code word and outputs the 5-bit code word to a modulator 1303, and a 5-bit coding section 1302 converts the value output from a lower digit information generation section 1202 to a 5-bit code word and outputs the 5-bit code word to a modulator 1304. Thus, in this embodiment, both the upper digit value and the lower digit value are converted to 5-bit code words, and therefore there is no difference between them in insusceptibility to errors from a code word standpoint.

Modulator 1303 modulates the code word output from 5-bit coding section 1301, and outputs it to an upper digit spreading section 1305. Modulator 1304 modulates the code word output from 5-bit coding section 1302, and outputs it to a lower digit spreading section 1306.

The upper digit spreading section 1305 spreads the output signal from modulator 1303, and outputs the spread signal to an upper digit power controller 1307. The lower digit spreading section 1306 spreads the output signal from modulator 1304, and outputs the spread signal to a lower digit power controller 1308. At this time, the upper digit spreading section 1305 and lower digit spreading section 1306 perform their respective spreading processing using different spreading codes of the same spreading factor. That is to say, the upper digit value of the CIR value and the lower digit value of the CIR value are spread using different spreading codes that have the same spreading factor.

Based on the transmission power of a pilot signal output from a pilot power controller 209, the upper digit power controller 1307 controls the transmission power of the signal indicating the upper digit value of the CIR value, and outputs the signal that has undergone transmission power control to a code multiplexer 1309. Similarly, based on the transmission power of the pilot signal output from the pilot power controller 209, the lower digit power controller 1308 controls the transmission power of the signal indicating the lower digit value of the CIR value, and outputs the signal that has undergone transmission power control to the code multiplexer 1309. The actual transmission power control method will be described later herein.

The code multiplexer 1309 multiplexes the signal indicating the upper digit value of the CIR value and the signal indicating the lower digit value of the CIR value in the same time slot. That is to say, the code multiplexer 1309 performs code multiplexing of the signal indicating the upper digit value and the signal indicating the lower digit value.

Next, the operation of a communication terminal with the above configuration will be described.

In the upper digit power controller 1307, a signal indicating the upper digit value of a CIR value is adjusted to a transmission power whose only predetermined value is higher than the pilot signal transmission power. In the lower digit power controller 1308, a signal indicating the lower digit value of the CIR value is adjusted to a transmission power whose only predetermined value is lower than the pilot signal transmission power. That is to say, the transmission power is increased in proportion to the value of the upper digit in the CIR value.

Thus, a communication terminal according to this embodiment can transmit with insusceptibility to errors made proportional to the upper digit value for which the amount of change is large by transmitting with transmission power increased in proportion to the upper digit value of a CIR value. By this means, even if an error should occur in a CIR signal in the propagation path, the probability of being able to perform reception correctly at the base station is proportionally higher according to the value of the upper digit in a CIR value, and the degree of error in CIR values can be kept low. Thus, it is possible to reduce the possibility of an erroneous communication mode being determined in the base station.

Also, in this embodiment, by increasing transmission power of the upper digit value compared with conventional CIR signal transmission power (here, the pilot signal transmission power), and decreasing transmission power of the lower digit value by the amount by which it is increased for the upper digit value, giving a total transmission power increase/decrease value of ±0 dB, the overall CIR signal transmission power is kept the same as conventional CIR signal transmission power. Thus, according to this embodiment, it is possible to perform transmission within susceptibility to errors made proportional to the upper digit value while keeping CIR signal transmission power the same as in a conventional system. That is to say, it is possible to perform transmission with insusceptibility to errors made proportional to the upper digit value without reducing uplink capacity compared with a conventional system.

Embodiment 8

A communication terminal according to Embodiment 8 of the present invention transmits with spreading performed using a spreading code with a higher spreading factor in proportion to the value of the upper digit in a CIR value.

A communication terminal according to this embodiment differs from a communication terminal according to Embodiment 6 or 7 only in the internal configuration of the CIR signal creation section 1101, and therefore only the CIR signal creation section 1101 will be described in the following description.

Figure 17:
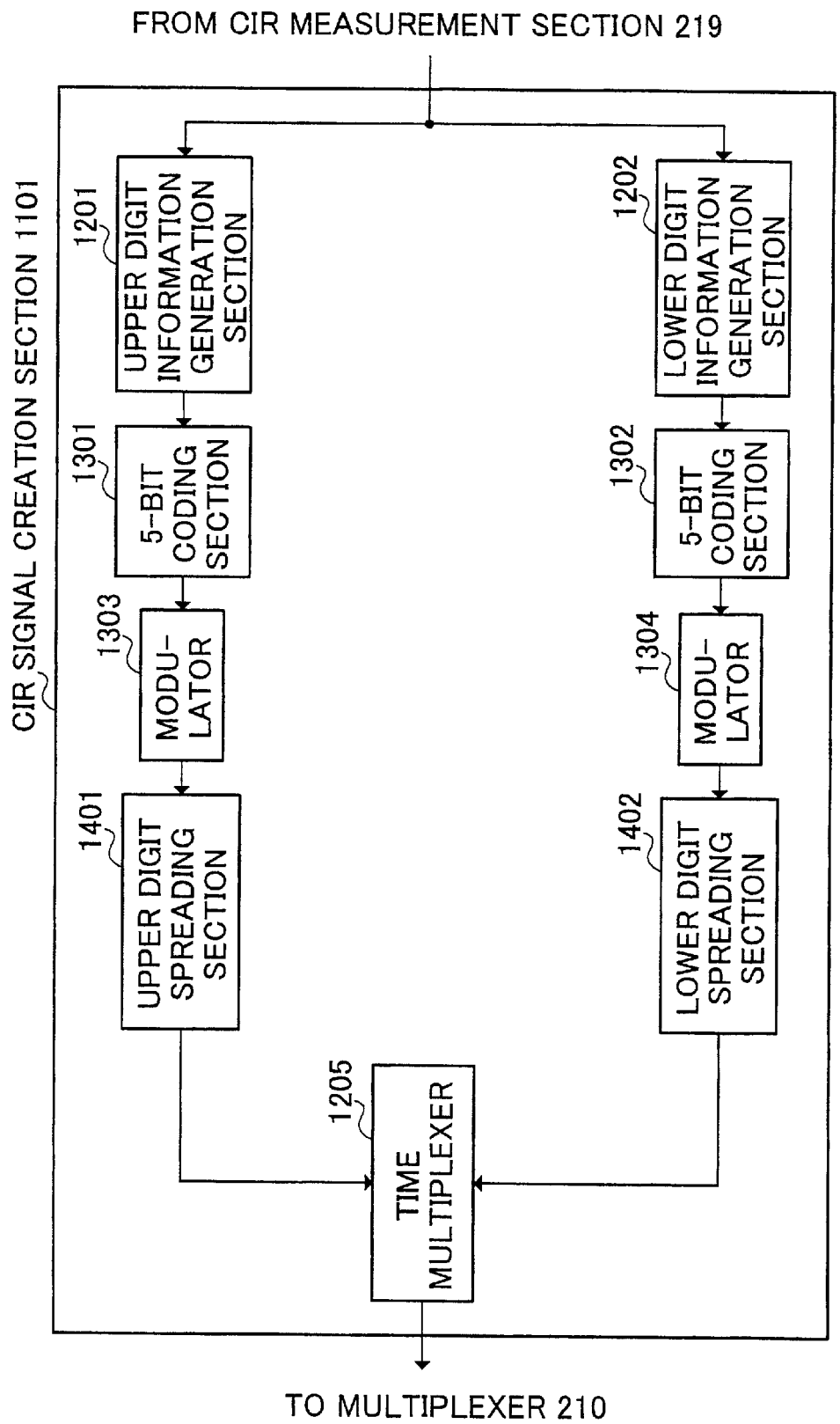
FIG. 17 is a block diagram showing the configuration of the CIR signal creation section of a communication terminal according to Embodiment 8 of the present invention.

FIG. 17 is a block diagram showing the configuration of the CIR signal creation section of a communication terminal according to Embodiment 8 of the present invention. In the following description, parts identical to those in FIG. 15 or FIG. 16 are assigned the same reference numerals as in FIG. 15 or FIG. 16 and their detailed explanations are omitted.

The CIR signal creation section 1101 shown in FIG. 17 converts a CIR value measured by a CIR measurement section 219 to a code word, and then creates a CIR signal, with spreading performed using a spreading code with a higher spreading factor in proportion to the value of the upper digit.

In FIG. 17, an upper digit spreading section 1401 spreads the output signal from modulator 1303 and outputs the resulting signal to a time multiplexer 1205, and a lower digit spreading section 1402 spreads the output signal from modulator 1304 and outputs the spread signal to the time multiplexer 1205. At this time, the upper digit spreading section 1401 performs spreading processing with a spreading code of the same kind as used by the lower digit spreading section 1402 and with a higher spreading factor than that of the lower digit spreading section 1402. That is to say, the upper digit value of the CIR value is spread with a higher spreading factor than the lower digit value. As a result, insusceptibility to errors in the propagation path is proportional to the upper digit value.

Thus, a communication terminal according to this embodiment can transmit with insusceptibility to errors made proportional to the upper digit value for which the amount of change is large by transmitting with spreading performed using a spreading code with a higher spreading factor in proportion to the value of the upper digit in a CIR value. By this means, even if an error should occur in a CIR signal in the propagation path, the probability of being able to perform reception correctly at the base station is proportionally higher according to the value of the upper digit in a CIR value, and the degree of error in CIR values can be kept low. Thus, it is possible to reduce the possibility of an erroneous communication mode being determined in the base station.

Also, in this embodiment, the spreading factor for the upper digit value is increased compared with a conventional CIR signal spreading factor, and the spreading factor for the lower digit value is decreased by the amount by which it is increased for the upper digit value. By this means, the amount of data sent in one slot is kept the same as for a conventional CIR signal. Thus, according to this embodiment, it is possible to perform transmission with insusceptibility to errors made proportional to the upper digit value without reducing the amount of data sent in one slot.

It is also possible to implement the present invention by combining a communication terminal according to above-described Embodiment 1 and a communication terminal according to above-described Embodiment 2. Moreover, it is also possible to implement the present invention by combining a communication terminal according to above-described Embodiment 4 and a communication terminal according to above-described Embodiment 5. Furthermore, it is also possible to implement the present invention by combining the respective communication terminals according to above-described Embodiments 6 to 8. In addition, it is also possible for the transmission power table provided in a communication terminal according to above-described Embodiment 4 and the code word table provided in a communication terminal according to above-described Embodiment 5 to be rewritten as appropriate based on a control signal from the base station, in the same way as in above-described Embodiment 3.

Also, in above-described Embodiments 1 to 8, a case has been described where a pilot signal is time-multiplexed, but above-described Embodiments 1 to 8 are not limited to this, and can also be applied to a case where a pilot signal is code-multiplexed.

Moreover, in above-described Embodiments 1 to 8, a CIR has been used as a value that indicates pilot signal reception quality, but this is not a limitation, and any value may be used as long as it is a value that indicates reception quality.

Furthermore, in above-described Embodiments 1 to 5, the predetermined threshold value set in the unused DRC detection section or the unused CIR detection section is assumed to be a fixed value, but a configuration may also be used whereby the threshold value is varied adaptively in accordance with the DRC signal error rate or CIR signal error rate.

In addition, in above-described Embodiments 6 to 8, either time multiplexing or code multiplexing may be used when multiplexing code words.

Also, in above-described Embodiments 6 to 8, an example has been given in which a CIR value is represented by one integer-part digit and one fractional-part digit. However, this is not a limitation, and above-described Embodiments 6 to 8 may all be implemented for CIR values represented by a plurality of digits.

Moreover, in above-described Embodiments 6 to 8, the value of the upper digit of a CIR value has been described as "information for which the amount of change is large". However, "information for which the amount of change is large" does not necessarily correspond to the size of a digit. For example, if a method is used whereby a CIR value is represented by an integer by first indicating a broad value of 0 db, 2dB, 4 dB, 6 dB ... changing by 2 dB at a time, and adding information indicating the presence or absence of an increment of 1 dB for that broad value, a value changing by 2 dB at a time is "information for which the amount of change is large". With this method, to represent a CIR value of 7 dB, for example, CIR information that includes information indicating 6 dB and information indicating that there is an increment of 1 dB is transmitted to the base station. At this time, the communication terminal apparatus transmits the information indicating 6 dB with greater insusceptibility to errors than the information indicating that there is an increment of 1 dB, in the same way as in above-described Embodiments 6 to 8.

As described above, according to the present invention it is possible to prevent a fall in downlink throughput in a communication system in which communication resources are allocated to communication terminals based on downlink channel quality.

This application is based on Japanese Patent Application No. 2000-234420 filed on Aug. 2, 2000, and Japanese Patent Application No. 2000-285405 filed on Sep. 20, 2000, entire content of which is expressly incorporated by reference herein.

What is claimed is:

1. A communication terminal apparatus comprising:
   a measurer that measures a downlink channel quality and outputs information that is generated in association with said downlink channel quality and composed of a plurality of digits including an upper digit and a lower digit;
   a coder that encodes the information such that the upper digit has a larger code word minimum distance than the lower digit; and
   a transmitter that transmits the encoded information to a base station apparatus.

2. The communication terminal apparatus according to claim 1, wherein the upper digit contains a most significant bit of the information.

3. A communication terminal apparatus comprising:
   a measurer that measures a downlink channel quality and outputs information that is generated in association with said downlink channel quality and composed of a plurality of digits including an upper digit and an lower digit;
   a coder that encodes the information such that the upper digit is assigned a larger number of bits than the lower digit; and
   a transmitter that transmits the encoded information to a base station apparatus.

4. The communication terminal apparatus according to claim 3, wherein the upper digit contains a most significant bit of the information.

5. A coding and transmission method for use in a communication system where a base station apparatus assigns a downlink channel to each of a plurality of communication terminal apparatuses on a time division basis, wherein said each of a plurality of communication terminal apparatuses:
   encodes information that is used for the assignment of the downlink channel and composed of a plurality of digits including an upper digit and a lower digit such that the upper digit has a larger code word minimum distance than the lower digit; and
   transmits the encoded information to said base station apparatus.

6. The coding and transmission method according to claim 5, wherein the upper digit contains a most significant bit of the information.

7. A coding and transmission method for use in a communication system where a base station apparatus assigns a downlink channel to each of a plurality of communication terminal apparatuses on a time division basis, wherein said each of a plurality of communication terminal apparatuses:
   encodes information that is used for the assignment of the downlink channel and composed of a plurality of digits including an upper digit and a lower digit such that the upper digit is assigned a larger number of bits than the lower digit; and
   transmits the encoded information to said base station apparatus.

8. The coding and transmission method according to claim 7, wherein the upper digit contains a most significant bit of the information.

* * * * *